(12) United States Patent
Nakazawa

(10) Patent No.: US 12,118,511 B2
(45) Date of Patent: Oct. 15, 2024

(54) HISTORY MANAGEMENT APPARATUS, HISTORY MANAGEMENT METHOD, AND PROGRAM

(71) Applicant: Synca-Outfit NQ co., Ltd., Tokyo (JP)

(72) Inventor: Hideta Nakazawa, Tokyo (JP)

(73) Assignee: SYNCA GROUP, LTD., Tokyo (JP)

(*) Notice: Subject to any disclaimer, the term of this patent is extended or adjusted under 35 U.S.C. 154(b) by 450 days.

(21) Appl. No.: 17/327,549

(22) Filed: May 21, 2021

(65) Prior Publication Data
US 2022/0083971 A1  Mar. 17, 2022

Related U.S. Application Data

(63) Continuation of application No. PCT/JP2020/034934, filed on Sep. 15, 2020.

(51) Int. Cl.
| | |
|---|---|
| *G06Q 10/0875* | (2023.01) |
| *G06F 16/21* | (2019.01) |
| *G06Q 10/0631* | (2023.01) |
| *G06Q 10/083* | (2024.01) |
| *G06Q 10/0833* | (2023.01) |

(52) U.S. Cl.
CPC ....... *G06Q 10/0875* (2013.01); *G06F 16/219* (2019.01); *G06Q 10/06315* (2013.01); *G06Q 10/0833* (2013.01); *G06Q 10/0838* (2013.01)

(58) Field of Classification Search
CPC ......... G06Q 10/0875; G06Q 10/06315; G06Q 10/0833; G06Q 10/0838; G06F 16/219
See application file for complete search history.

(56) References Cited

U.S. PATENT DOCUMENTS

| | | | | |
|---|---|---|---|---|
| 6,334,108 B1* | 12/2001 | Deaton | ............... | G06Q 30/0255 705/14.27 |
| 6,470,323 B1* | 10/2002 | Suzuki | ................. | G06Q 10/109 705/26.1 |
| 6,609,104 B1* | 8/2003 | Deaton | ............... | G06Q 30/0268 705/16 |
| 6,684,195 B1* | 1/2004 | Deaton | ................ | G06Q 20/387 705/14.38 |
| 7,367,498 B2* | 5/2008 | Kodaka | ................... | G06Q 30/06 705/16 |
| 7,660,753 B2* | 2/2010 | Sakuma | ................. | G06Q 10/06 705/28 |

(Continued)

*Primary Examiner* — Michael Jared Walker
(74) *Attorney, Agent, or Firm* — Alley IP

(57) ABSTRACT

A history management apparatus includes a first memory that stores an inventory transaction history information record associating the quantity of a management target with a unique group number, and a control unit that stores, in a second memory, an inventory transaction history detailed information record assigning a unique sequence number and a first flag indicating an existence of the management target to each preset quantity of the management target with respect to the quantity of the management target, stores, in response to a decrease in the quantity of the management target, the decreased quantity in association with a new group number in the first memory, and changes, to a second flag indicating an absence of the management target, each first flag included in inventory transaction history detailed information records which are stored in the second memory and the number of which is equal to the decreased quantity.

7 Claims, 33 Drawing Sheets

(56) References Cited

U.S. PATENT DOCUMENTS

| | | | |
|---|---|---|---|
| 11,017,193 B2* | 5/2021 | Hiramatsu | G06Q 20/208 |
| 2006/0095346 A1* | 5/2006 | Gambhir | G06Q 30/0601 |
| | | | 705/28 |
| 2009/0008450 A1* | 1/2009 | Ebert | G06Q 10/08 |
| | | | 235/439 |
| 2018/0253711 A1* | 9/2018 | Suzuki | G06Q 20/203 |
| 2019/0108484 A1* | 4/2019 | Watanabe | G07G 1/0036 |
| 2019/0163597 A1* | 5/2019 | Shibamura | G06Q 10/20 |
| 2021/0065102 A1* | 3/2021 | Suzuki | H04W 4/35 |

* cited by examiner

INVENTORY TRANSACTION
T1 HISTORY INFORMATION TABLE

| DATA ITEM NAME | ATTRIBUTE | REMARKS |
|---|---|---|
| GROUP NO. | NUMERICAL VALUE | NUMBERING (12 DIGITS) |
| STORAGE/RETRIEVAL CATEGORY | STRING | BLANK:INITIAL VALUE/ 1:STORAGE/ 2:RETRIEVAL/ 3:INVENTORY MASTER UPDATE |
| TRANSACTION DATE | STRING | STORAGE/RETRIEVAL DATE |
| STORAGE PLACE | STRING | STORAGE PLACE CODE |
| ITEM | STRING | ITEM CODE |
| MAKER | STRING | PART MAKER |
| DELIVERY DESTINATION | STRING | DELIVERY DESTINATION CODE |
| PRODUCT NO. | STRING | ITEM: SUPPLIER: PRODUCT IS IDENTIFIED BY PRODUCT NO. |
| STORAGE DATE AND TIME | STRING | DATE AND TIME OF STORAGE |
| STORAGE TYPE | STRING | INVENTORY ORDER, INVENTORY TRANSFER, RETURN STORAGE… |
| STANDARD PRICE | NUMERICAL VALUE | REGULAR PRICE OF PRODUCT |
| RETAIL PRICE | NUMERICAL VALUE | SAME RETAIL PRICE AS IN INVENTORY STATUS |
| RATIO OF WHOLESALE PRICE TO RETAIL PRICE | NUMERICAL VALUE | SAME RATIO OF WHOLESALE PRICE TO RETAIL PRICE AS IN INVENTORY STATUS |
| WHOLESALE PRICE | NUMERICAL VALUE | WHOLESALE PRICE AT STORAGE OF ITEM |
| STORAGE QUANTITY | NUMERICAL VALUE | NUMBER OF STORED ITEMS AT STORAGE |
| RETRIEVAL DATE AND TIME | STRING | DATE AND TIME OF RETRIEVAL |
| RETRIEVAL TYPE | STRING | SALES, INVENTORY TRANSFER, RETURN TO SUPPLIER… |
| RETRIEVAL QUANTITY | NUMERICAL VALUE | RETRIEVAL QUANTITY AT RETRIEVAL |
| REASONS | NUMERICAL VALUE | REASONS FOR STORAGE/RETRIEVAL (STORAGE TYPE, COMMISSION TYPE, ETC.) |
| SHELF NO. | STRING | SHELF NUMBER FOR STORAGE AND RETRIEVAL |
| COMMISSION TYPE | NUMERICAL VALUE | COMMISSION: CUSTODY TYPE |
| COMMISSION BRANCH | STRING | COMMISSION: STORAGE PLACE FOR CUSTODY |
| COMMISSION CLIENT | STRING | COMMISSION: CLIENT OR SUPPLIER FOR CUSTODY |
| PURCHASE SLIP NO. | STRING | DELIVERY (SALES), PURCHASE SLIP NO. AT THE TIME OF RETURN |
| PAST SERIAL | STRING | PAST SERIAL (CURRENTLY NOT USED) |
| STANDARD PRICE | NUMERICAL VALUE | LIST PRICE OF PRODUCT BEFORE PRICE UPDATE |
| WHOLESALE PRICE | NUMERICAL VALUE | WHOLESALE PRICE BEFORE PRICE UPDATE OF ITEM |
| RECORD NO. | NUMERICAL VALUE | UNIQUE CODE NUMBER: MAIN KEY |
| BASE UNIT | STRING | UNIT OF MEASUREMENT (ITEM, g, cc, etc.) WITH RESPECT TO PRODUCT NUMBER |
| CATEGORY | STRING | BRANK: INITIAL VALUE/1:LOGISTICS/2:PRODUCTION |

T2 INVENTORY TRANSACTION HISTORY DETAILED INFORMATION TABLE

| DATA ITEM NAME | ATTRIBUTE | REMARKS |
|---|---|---|
| SEQUENCE NO. | NUMERICAL VALUE | NUMBERING (12 DIGITS) |
| STORAGE GROUP NO. | TEXT | ENTER GROUP NO. SET IN HISTORY TABLE (AT STORAGE) |
| RETRIEVAL GROUP NO. | TEXT | ENTER GROUP NO. SET IN HISTORY TABLE (AT RETRIEVAL) |
| STORAGE DATE | TEXT | STORAGE DATE |
| RETRIEVAL DATE | TEXT | RETRIEVAL DATE |
| QUANTITY | NUMERICAL VALUE | SET TO ONE |
| ALLOCATION FLAG | NUMERICAL VALUE | BEFORE ALLOCATION: 0<br>AT MATERIAL ALLOCADTION: 1<br>AT RETRIEVAL FOR DELIVERY: 2<br>AT DELIVERY ARRIVAL: 3<br>※ SEQUENCES WITH ALLOCATION FLAGS OF VALUES OTHER THAN 0 ARE TREATED AS RETRIEVAL-COMPLETED SEQUENCES (ALREADY USED), AND ARE EXCLUDED FROM ALLOCATION |
| HEADER RECORD NO. | NUMERICAL VALUE | USED FOR LINK WITH HEADER INFORMATION |
| RECORD NO. | NUMERICAL VALUE | UNIQUE RECORD NO.: MAIN KEY |
| GPS NO. | NUMERICAL VALUE | SERIAL NO. FOR GPS TRACKING |
| DELIVERY DATE | TEXT | ENTER DATE OF ARRIVAL OF DELIVERY, FOUND BY GPS TRACKING |

INVENTORY STATUS SCREEN
40

| SEQUENCE NO. | GROUP NO. | STORAGE DATE | QUANTITY |
|---|---|---|---|
| 20 | 3 | 2020/03/06 | 1 |
| 26 | 7 | 2020/03/15 | 1 |
| 27 | 7 | 2020/03/15 | 1 |
| 28 | 7 | 2020/03/15 | 1 |
| 29 | 7 | 2020/03/15 | 1 |
| 30 | 7 | 2020/03/15 | 1 |

PRODUCT NUMBER
MASTER TABLE
T4

| PRODUCT NO. | MATERIAL NO. | USAGE QUANTITY |
|---|---|---|
| ABCD-1234 | A | 500 |
| ABCD-1234 | B | 50 |
| ABCD-1234 | C | 20 |

PRODUCT NUMBER
MASTER TABLE
T4a

| PRODUCT NO. | MATERIAL NO. | USAGE QUANTITY |
|---|---|---|
| XYZ-999 | D | 20 |
| XYZ-999 | E | 20 |

FIG. 16

INVENTORY STATUS SCREEN
40

| SEQUENCE NO. | MATERIAL NO. | STORAGE GROUP NO. | STORAGE DATE | QUANTITY |
|---|---|---|---|---|
| 13 | B | 1 | 2020/4/1 | 10 |
| 14 | B | 1 | 2020/4/1 | 10 |
| 19 | C | 1 | 2020/4/1 | 10 |

FIG. 24

MATERIAL NUMBER
INFORMATION TABLE
T3a

| MATERIAL NO. | BASE UNIT | MINIMUM USAGE QUANTITY |
|---|---|---|
| A | g | 50 |
| B | g | 25 |
| C | cc | 100 |
| PACKING BOX A | ITEM | 1 |
| PACKING BOX B | ITEM | 1 |

PRODUCT NUMBER MASTER TABLE
T4b

| PRODUCT NO. | MATERIAL NO. | USAGE QUANTITY | BASE UNIT |
|---|---|---|---|
| XYZ | A | 100 | g |
| XYZ | B | 50 | g |
| XYZ | C | 300 | cc |
| XYZ | PACKING BOX A | 1 | 10 × 20 × 30 |
| XYZ | PACKING BOX B | 1 | 5 × 10 × 20 |

FIG. 26

HISTORY MANAGEMENT APPARATUS, HISTORY MANAGEMENT METHOD, AND PROGRAM

RELATED APPLICATIONS

This application claims priority under 35 U.S.C. § 120 to, and is a continuation of, co-pending International Application PCT/JP2019/034934, filed Sep. 15, 2020 and designating the US. This International application is incorporated by reference herein in its entirety.

FIELD

The embodiments discussed herein relate to a history management apparatus, a history management method, and a program.

BACKGROUND

Techniques for inventory management have been known. For example, the following technique has been known, which includes an inventory information storage unit that stores inventory information including reel IDs given to reels of components in inventory to identify the reels, in addition to the storage locations and inventory quantity of the components in inventory, a high-order information storage unit that stores information on the processing progresses of high orders, a retrieval request information storage unit that stores information on the processing progresses of retrieval requests made based on the high orders, and a processing unit that performs allocation of reels of the components in inventory and makes the retrieval requests, and also records retrieval transactions and storage transactions, wherein the processing unit specifies an item, storage location, retrieval quantity, and reel ID and makes a retrieval request for a reel of the components in inventory, and also employs a temporary retrieval state as the inventory status of the reels and performs inventory management.

Please see, for example, Japanese Laid-open Patent Publication No. 11-116014.

Since it is not possible to perform centralized management of purchased products, sold products, and products in inventory, every company has the same problems in that they are not able to know whether all products listed on purchase invoices have actually been bought, whether no error has occurred in sales, whether products in inventory are placed on shelves as determined, and whether the inventory quantity is always correct. Even if computers with high computing capability are used, humans need to make final confirmation by themselves. As the number of products increases, the confirmation task needs a lot of time and cost.

SUMMARY

To accomplish the above object, there is provided a disclosed history management apparatus. This history management apparatus includes a first memory that stores a first information record associating a quantity of a management target with a unique first number; a second memory that stores a second information record assigning a unique second number and a unique first flag to each preset quantity of the management target with respect to the quantity of the management target, the unique first flag indicating an existence of the management target; and a processor that stores, in response to a decrease in the quantity of the management target, the decreased quantity of the management target in association with a new first number in the first memory, and changes, to a second flag, the first flag included in each of second information records which are stored in the second memory and a number of which is equal to the decreased quantity of the management target, the second flag indicating an absence of the management target.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of information that is stored in an inventory transaction history information storage unit.

FIG. 4 illustrates an example of information that is stored in an inventory transaction history detailed information storage unit.

FIG. 16 illustrates an example of information that is stored in a product number master storage unit.

FIG. 24 illustrates a year-end inventory status according to the second embodiment.

FIG. 26 illustrates an example of information that is stored in a product number master storage unit according to the third embodiment.

DETAILED DESCRIPTION

Figure 1:
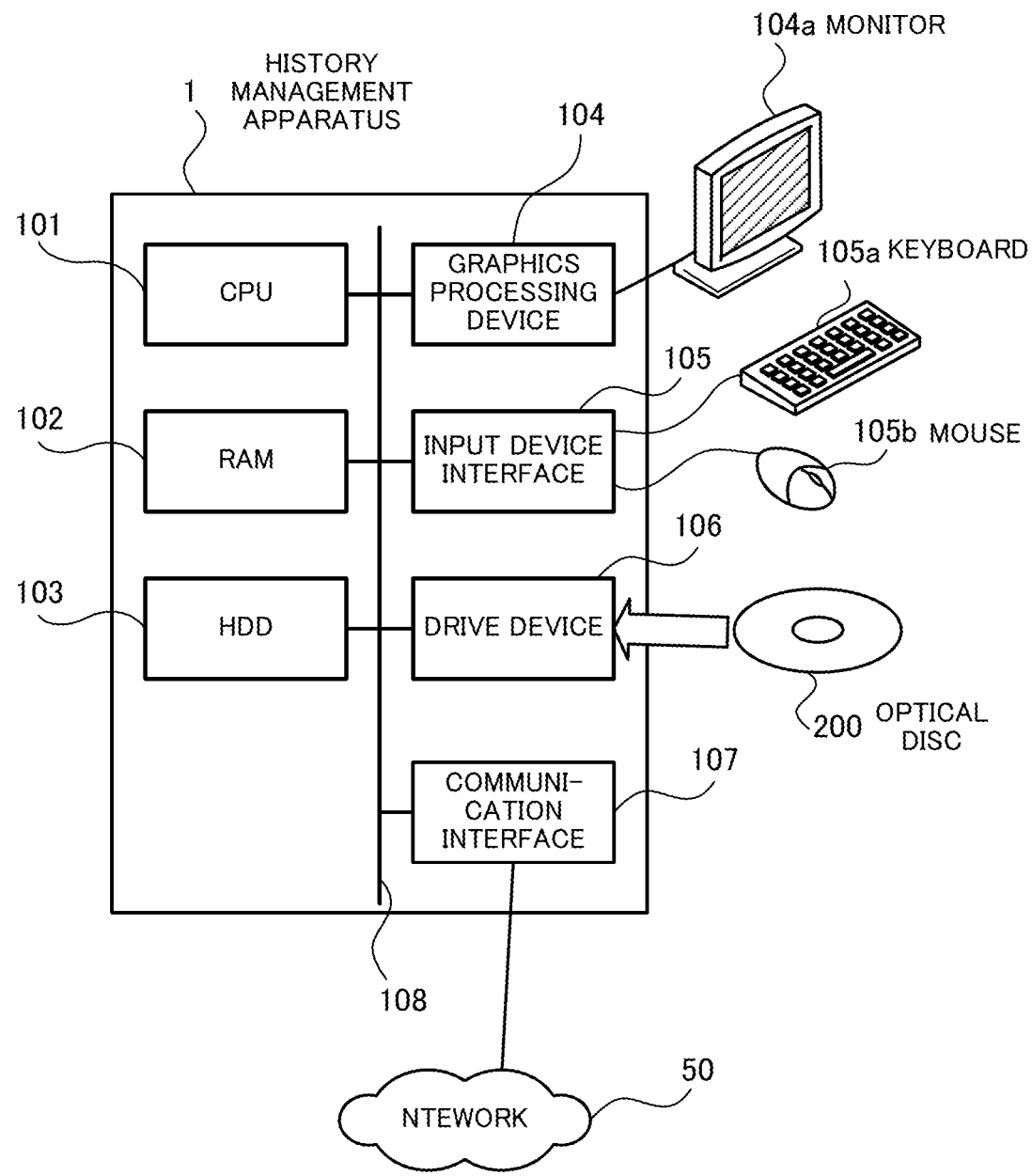
FIG. 1 illustrates a hardware configuration of a history management apparatus according to one embodiment.

Hereinafter, a history management apparatus according to some embodiments will be described in detail with reference to the accompanying drawings.

For easy understanding of the embodiments, the position, size, shape, range, and others of each component illustrated in the drawings may not represent the actual position, size, shape, range, and others. Therefore, the embodiments are not limited to the illustrated positions, sizes, shapes, ranges, and others.

Elements that are each expressed in a singular form in the embodiments may be plural in use, expect otherwise particularly specified in writing.

Embodiment

A history management apparatus (computer) of a first embodiment is an apparatus that manages a history of logistics for management targets. The management targets are not limited to any particular things, but solids, liquids, gases, and others may be used as management targets.

For example, a delivery slip is issued when items A are sold to a customer. In the case where N items A are sold, "N" is indicated in the quantity field of the delivery slip and an amount calculated by multiplying a unit price by N is indicated as a sales amount.

Consider that items A are to be stored for inventory, i.e., inventory items. When N items A are purchased, these items A are stored for inventory at a prescribed place, and the inventory value is increased by an amount calculated by multiplying the wholesale price by N.

Consider now that M items A in inventory (inventory items A) are sold. If N>M, the inventory value is changed to the amount calculated by "(N−M)×wholesale price."

In any case, the history management apparatus 1 uses N in calculation.

In the case where N items A are in inventory, N being greater than zero, the history management apparatus of the embodiment divides them into n1, n2, n3, ..., nN, assigns N sequence numbers to the items A (numbering), and when M items A are sold (purchased, stored for inventory), locally performs a sales (purchase, inventory) process on each of n1, n2, n3, ..., nM to manage the M sales and (N−M) remaining inventory items, so that any error that may has occurred in the sales, purchase, or inventory is found.

The following describes the disclosed history management apparatus in more detail.

FIG. 1 illustrates the hardware configuration of a history management apparatus according to the embodiment.

The history management apparatus 1 is entirely controlled by a CPU (central processing unit) 101. A RAM (random access memory) 102 and a plurality of peripheral devices are connected to the CPU 101 via a bus 108.

The RAM 102 is used as a main storage device of the history management apparatus 1. The RAM 102 temporarily stores therein at least part of OS (operating system) programs and application programs that are executed by the CPU 101. In addition, the RAM 102 stores therein various kinds of data to be used by the CPU 101 in processing.

Connected to the bus 108 are an HDD (hard disk drive) 103, a graphics processing device 104, an input device interface 105, a drive device 106, and a communication interface 107.

The HDD 103 magnetically writes and reads data on a built-in disk. The HDD 103 is used as an auxiliary storage device of the history management apparatus 1. The OS programs, application programs, and various kinds of data are stored in the HDD 103. A semiconductor storage device, such as a flash memory, may be used as the auxiliary storage device.

The graphics processing device 104 is connected to a monitor 104a. The graphics processing device 104 displays images on a screen of the monitor 104a in accordance with instructions from the CPU 101. Examples of the monitor 104a include a display device using CRT (cathode ray tube) and a liquid crystal display.

The input device interface 105 is connected to a keyboard 105a and a mouse 105b. The input device interface 105 gives signals output from the keyboard 105a and mouse 105b to the CPU 101. The mouse 105b is an example of a pointing device, and another kind of pointing device may be used. Other examples of the pointing device include a touch panel, a tablet, a touchpad, and a trackball.

The drive device 106 reads data from, for example, a portable recording medium such as an optical disc, on which data is recorded so as to be readable with reflection of light, or a USB (universal serial bus) memory. For example, in the case where the drive device 106 is an optical drive device, data recorded on an optical disc 200 may be read with laser light or the like. Examples of the optical disc 200 include Blu-ray (registered trademark), DVD (digital versatile disc), DVD-RAM, CD-ROM (compact disc read only memory), CD-R (recordable), and CD-RW (rewritable).

The communication interface 107 is connected to a network 50. The communication interface 107 communicates data with another computer or communication device over the network 50.

With the above hardware configuration, the processing functions of the embodiment may be implemented.

The history management apparatus 1 with the hardware configuration illustrated in FIG. 1 is provided with the following functions.

Figure 2:
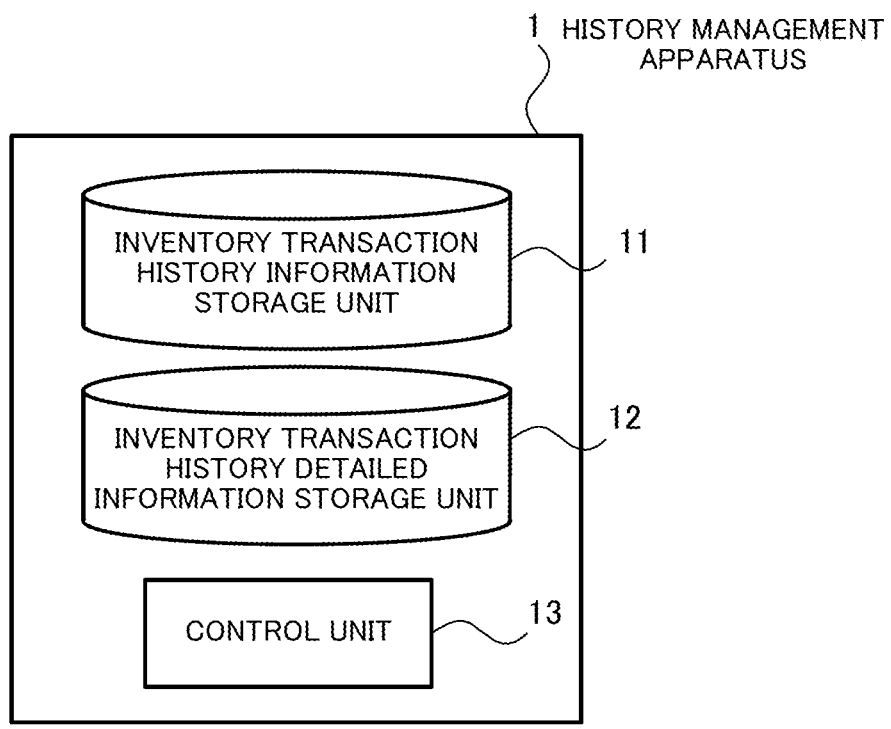
FIG. 2 is a block diagram illustrating functions of the history management apparatus according to the embodiment.

FIG. 2 is a block diagram illustrating functions of the history management apparatus according to the embodiment.

The history management apparatus 1 includes an inventory transaction history information storage unit 11, an inventory transaction history detailed information storage unit 12, and a control unit 13.

FIG. 3 illustrates an example of information that is stored in the inventory transaction history information storage unit.

In the embodiment, the information is stored in tabular form.

In the inventory transaction history information table T1 illustrated in FIG. 3, an attribute (a numerical value or string) is given to each data item. The meaning of each data item is described in the Remarks field. In this connection, the inventory transaction history information table T1 illustrated in FIG. 3 is just an example, and any desired data items may be added, changed, and deleted.

FIG. 4 illustrates an example of information that is stored in the inventory transaction history detailed information storage unit.

In the inventory transaction history detailed information table T2 illustrated in FIG. 4, an attribute (a numerical value or string) is given to each data item. The meaning of each data item is described in the Remarks field. In this connection, the inventory transaction history detailed information table T2 illustrated in FIG. 4 is just an example, and any desired data items may be added, changed, and deleted.

On the basis of an inventory status, the control unit 13 assigns a different sequence number to each quantity of one in connection with a product number (numbering), and creates sequences (records) for inventory transaction history information and inventory transaction history detailed information. In the case of year-end inventory, the control unit 13 appends "0" to group numbers in the inventory transaction history information. By doing so, it is recognized that the year-end inventory is allocated in allocation. The control unit 13 may give a GPS (global positioning system) number for use in tracking, to each quantity of one.

The following describes a history management method, using a concrete example.

Concrete Example

A concrete example is a history management method for logistics.

FIGS. 5 to 13 are views for explaining a concrete example of the history management method.

The following example describes storage and retrieval sequences in connection with items with product number ABCD-1234 (hereinafter, referred to as items X). Assume that the creation of history information starts on Mar. 1, 2020.

<Inventory Check Process>

Assume that the inventory quantity of the items X as of Mar. 1, 2020 is 10. A user operates the history management apparatus 1 to display a data input screen on the monitor 104a. Using the data input screen, the user enters information regarding the inventory quantity of the items X as of the end of February, 2020 into the history management apparatus 1.

Figure 5:
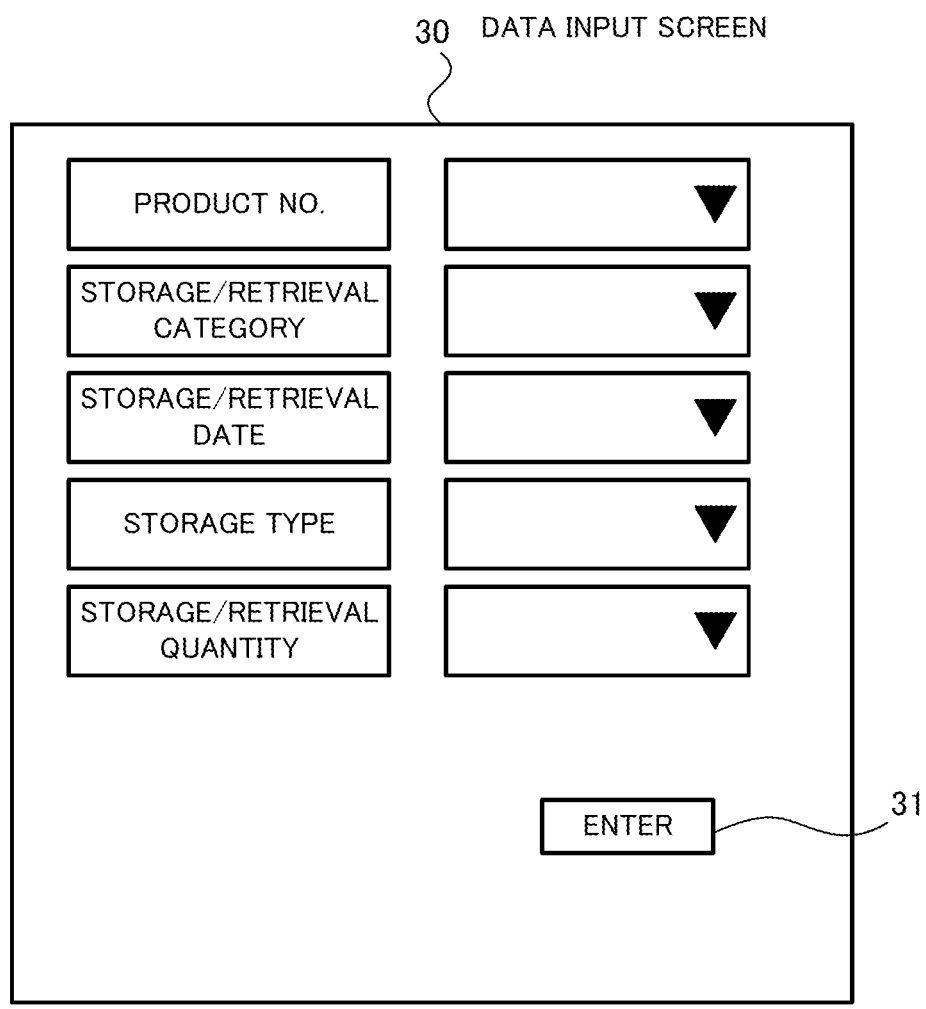
FIG. 5 illustrates an example of a data input screen.

FIG. 5 illustrates an example of the data input screen.

The data input screen 30 illustrated in FIG. 5 has the following fields: product number (No.), storage/retrieval category, storage/retrieval date, storage type, and storage/retrieval quantity. On the right side of each field, a numerical value or string is selectable by a pulldown menu. The numerical value or string may be entered directly.

After selecting a numerical value or string in each field, the user presses an enter button 31. In response to this, the history management apparatus 1 performs corresponding processing.

In this connection, the data input screen 30 may be provided with other fields to allow entry of other data items not illustrated (data items that are set in the inventory transaction history information table T1 and inventory transaction history detailed information table T2, and others) and their strings and numerical values. For example, for a storage process to be described later, the data input screen 30 may be modified to enter the following information: inventory order registration (a process of ordering a product number for inventory and registering this transaction), inventory transfer (a process of transferring inventory items between storage places, performing a minus process of the inventory quantity at a transfer source, and performing a plus process of the inventory quantity at a transfer destination) (transfer destination), commission custody (a process of transferring inventory items to a supplier and a process of transferring inventory items from a certain warehouse to an own company's warehouse) (return), inventory status (storage, an increase in inventory quantity), return slip (storage of returns), bulk storage and retrieval, bulk stocktaking, delivery slip, purchase order, year-end inventory, and others. In addition, for a retrieval process to be described later, the data input screen 30 may be modified to enter the following information: delivery slip (sales: retrieval: first-in first-out (FIFO)), return slip (return to supplier: retrieval return), inventory transfer (transfer source: retrieval: first-in first-out (FIFO)), commission custody (inventory: retrieval), inventory status (retrieval, a decrease in inventory quantity), bulk storage and retrieval, bulk stocktaking, and others.

Figure 6:
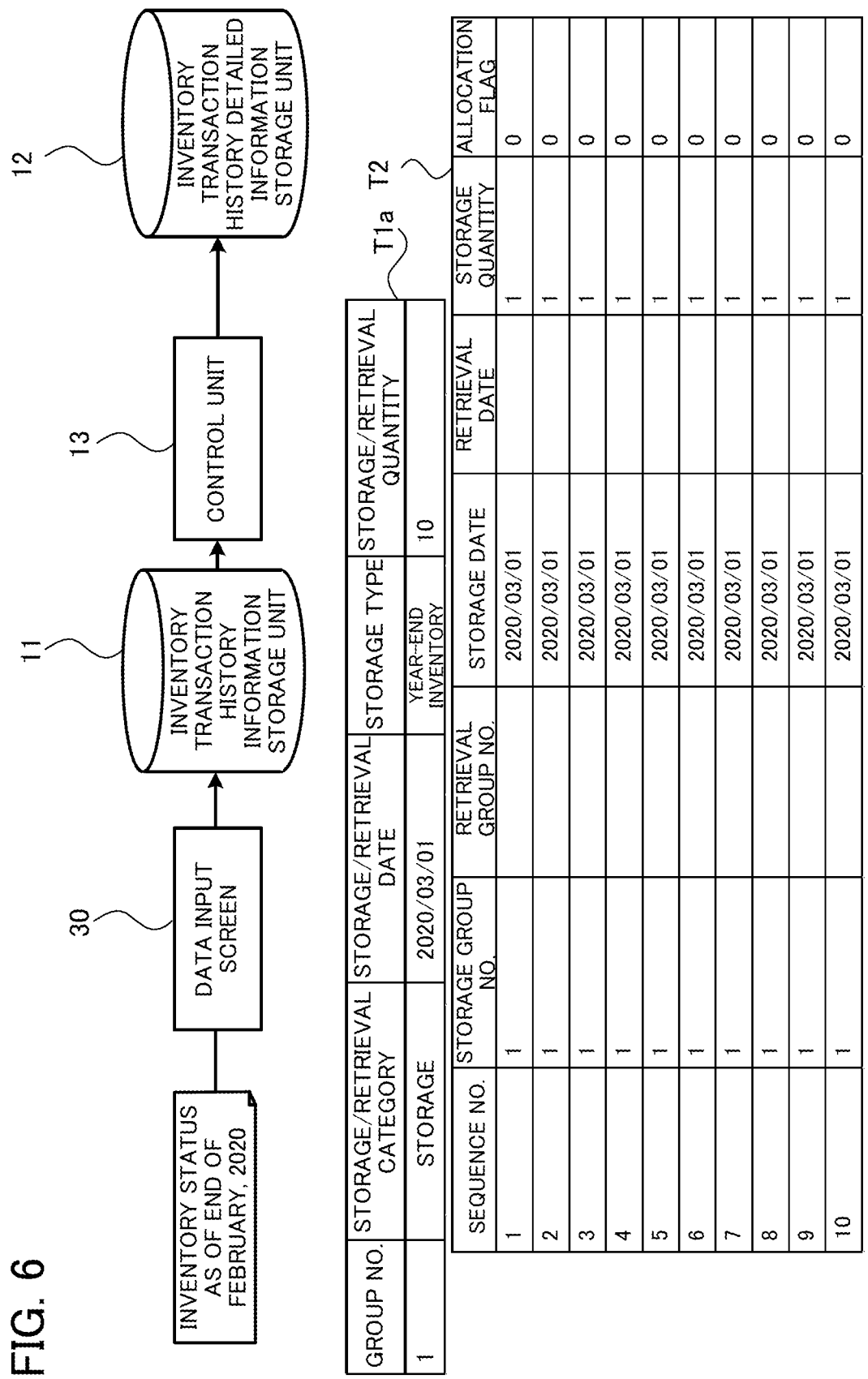
FIG. 6 is a view for explaining an inventory check process according to the first embodiment.

FIG. 6 is a view for explaining an inventory check process according to the first embodiment.

In the inventory check process in this concrete example, the user selects a storage/retrieval category of "storage," a storage/retrieval date of "Mar. 1, 2020," a storage type of "year-end inventory," and a storage/retrieval quantity of "10," and then presses the enter button 31. In response to this, the control unit 13 creates an inventory transaction history information table T1a for group number "1," as illustrated in FIG. 6. With regard to the group number, "1" is appended for year-end inventory. By doing so, it is recognized that the year-end inventory is allocated in allocation.

In addition, as described earlier, the control unit 13 creates an inventory transaction history detailed information table T2 in which a different sequence number "1" to "10" is assigned to each quantity of one for the items X on the basis of the inventory quantity. In addition, the control unit 13 sets "1" that is the group number set in the inventory transaction history information table T1a, in the storage group number fields of these records. Also, the control unit 13 sets "0" in the allocation flag fields of the records.

<Normal Inventory Retrieval Process>

The summary of a retrieval process is as follows.

An allocation process for the inventory quantity and retrieval quantity is added in a variety of retrieval processes.

As to allocation conditions.

1. In the case where a specific purchase slip number is indicated in a delivery slip, the following allocation is performed.

(1) Materials for use and the usage quantities of the materials that are registered in a product number master are fixed.

(2) In the case of non-inventory items, a purchase, storage, and retrieval process is performed at the time of a production process (with respect to the storage, purchased items are treated not as normal inventory but as temporary inventory).

(3) Allocation is performed with reference to inventory transaction history sequences under first-in first-out.

If it is found in the past data that the quantity is suspicious in a retrieval history, sequences are regarded as not existing. (This is used as a check point for tracking unjust inventory.)

Figure 7:
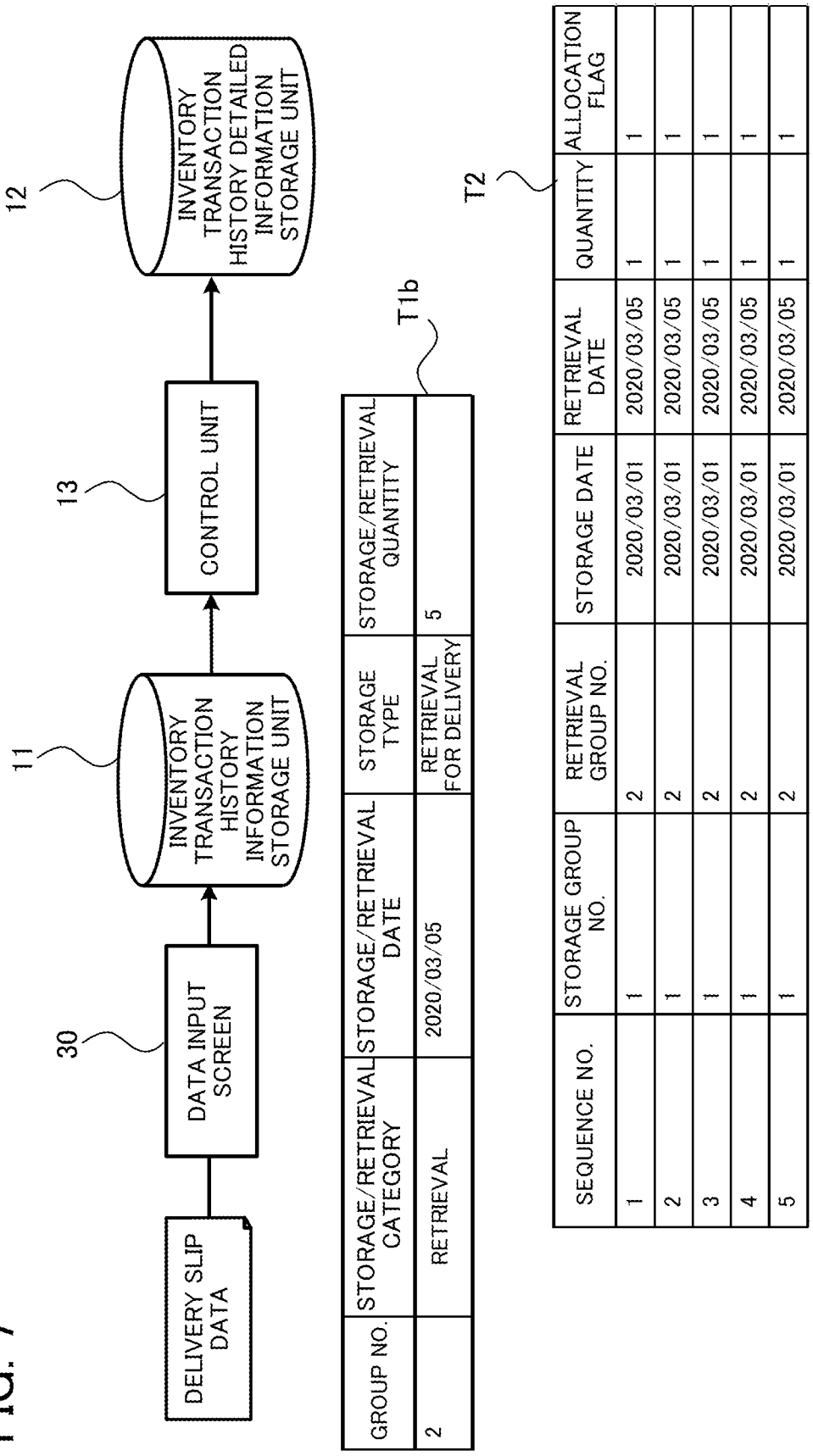
FIG. 7 is a view for explaining a normal inventory retrieval process according to the first embodiment.

FIG. 7 is a view for explaining a normal inventory retrieval process according to the first embodiment.

When receiving a request to retrieve five items X on Mar. 5, 2020, the user issues a delivery slip for the items X and retrieves five items X from inventory. The user operates the history management apparatus 1 to display the data input screen 30 on the monitor 104a. Using the data input screen 30, the user enters the retrieval quantity "5" of the items X into the history management apparatus 1.

When receiving the entry, the control unit 13 creates an inventory transaction history information table T1b for group number "2," as illustrated in FIG. 7. In addition, the control unit 13 refers to the inventory transaction history detailed information table T2 to extract five records in chronological order of storage date and ascending order of sequence number from records that have not been assigned retrieval group numbers. Referring to FIG. 7, the records with sequence numbers "1" to "5" are extracted.

The control unit 13 updates the inventory transaction history detailed information regarding the five items X of the extracted sequence numbers "1" to "5." More specifically, with respect to each record with the sequence numbers "1" to "5" in the inventory transaction history detailed information table T2, the control unit 13 sets "Mar. 5, 2020" in the inventory transaction history retrieval date field and also sets "2" that is the group number set in the inventory transaction history information table T1b, in the retrieval group number field. In addition, the control unit 13 sets "1" in the allocation flag fields of these records. In this connection, the explanation of the drawing includes only the inventory transaction history information table and changes in the inventory transaction history detailed information table. That is, the records with sequence numbers "6" to "10" have not been changed from the inventory transaction history detailed information table T2 illustrated in FIG. 6. This applies to the following explanation.

<Inventory Storage Process>

Figure 8:
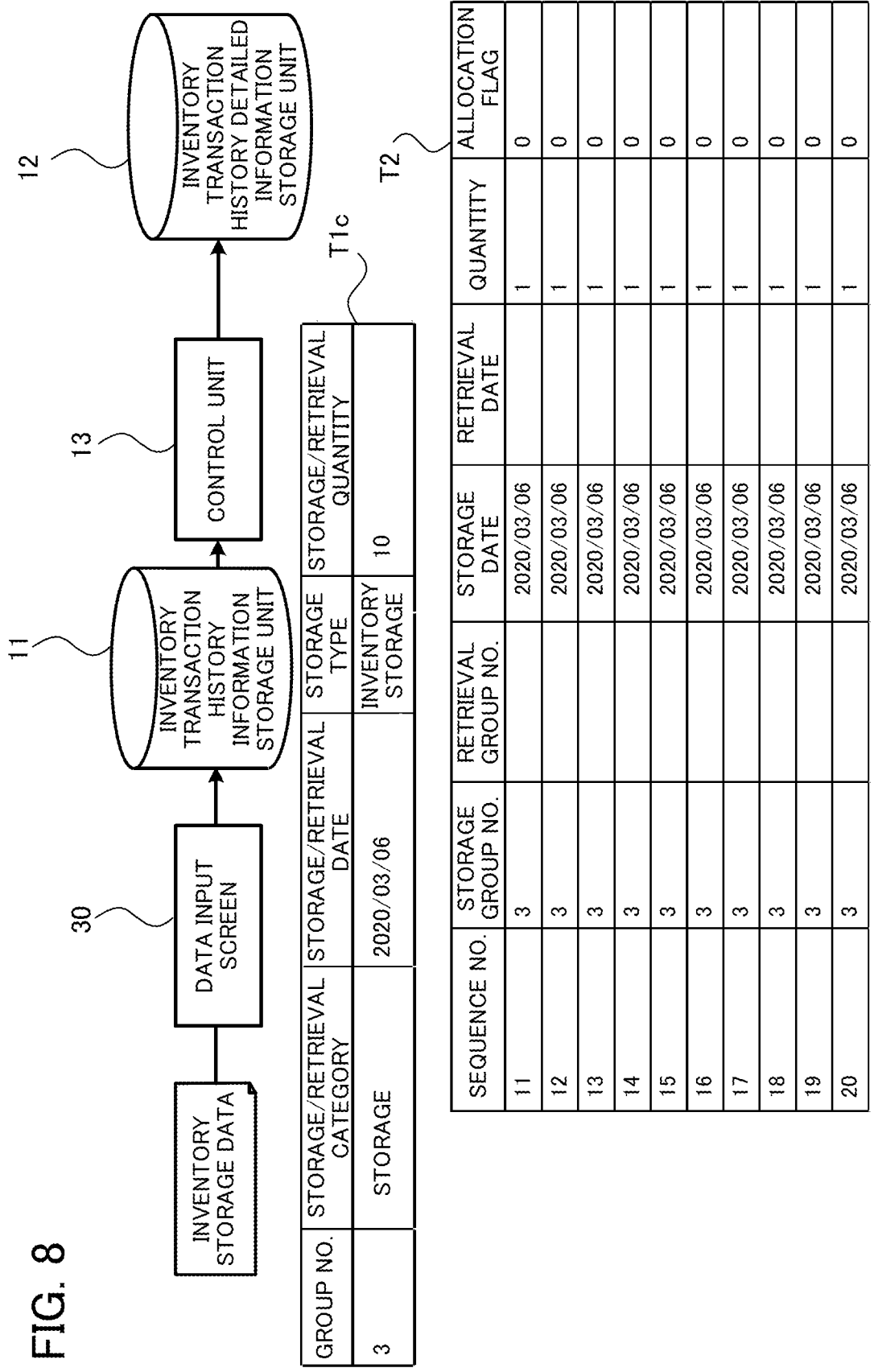
FIG. 8 is a view for explaining an inventory storage process according to the first embodiment.

FIG. 8 is a view for explaining an inventory storage process according to the first embodiment.

When ten items X are stored for inventory on Mar. 6, 2020, the user operates the history management apparatus 1 to display the data input screen 30 on the monitor 104a. Using the data input screen 30, the user enters the storage quantity "10" of the items X into the history management apparatus 1.

When receiving the entry, the control unit 13 creates an inventory transaction history information table T1c for group number "3," as illustrated in FIG. 8. In addition, the control unit 13 updates the inventory transaction history detailed information table T2 by assigning sequence numbers "11" to "20" to the ten stored items X, respectively. The control unit 13 also sets "3" that is the group number set in the inventory transaction history information table T1c, in the storage group number fields of these records.

<Normal Inventory Retrieval Process>

Figure 9:
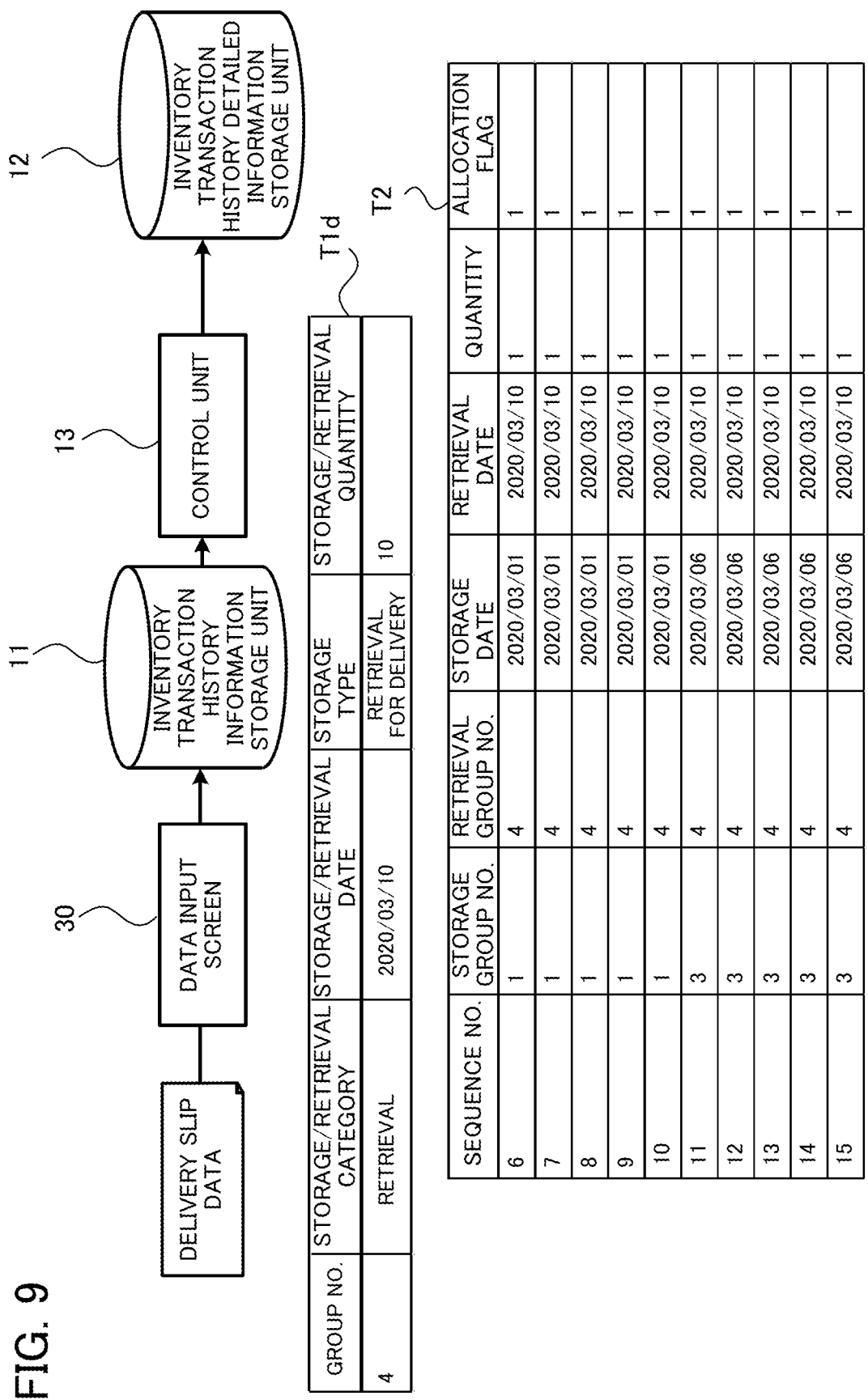
FIG. 9 is a view for explaining a normal inventory retrieval process according to the first embodiment.

FIG. 9 is a view for explaining a normal inventory retrieval process according to the first embodiment.

When receiving a request to retrieve ten items X on Mar. 10, 2020, the user issues a delivery slip for the items X and retrieves ten items X from inventory. The user operates the history management apparatus 1 to display the data input screen 30 on the monitor 104a. Using the data input screen 30, the user enters the retrieval quantity "10" of the items X into the history management apparatus 1.

When receiving the entry, the control unit 13 creates an inventory transaction history information table T1d for group number "4," as illustrated in FIG. 9. In addition, the control unit 13 refers to the inventory transaction history detailed information table T2 to extract ten records in chronological order of storage date and ascending order of sequence number from records that have not been assigned retrieval group numbers. Referring to FIG. 9, the records with sequence numbers "6" to "15" are extracted.

The control unit 13 updates the inventory transaction history detailed information regarding the ten items X of the extracted sequence numbers "6" to "15." More specifically, with respect to each record with the sequence numbers "6" to "15" in the inventory transaction history detailed information table T2, the control unit 13 sets "Mar. 10, 2020" in the inventory transaction history retrieval date field, and also sets "4" that is the group number set in the inventory transaction history information table T1d, in the retrieval group number field. In addition, the control unit 13 sets "1" in the allocation flag fields of these records.

<Non-Inventory Purchase and Retrieval Process>

Figure 10:
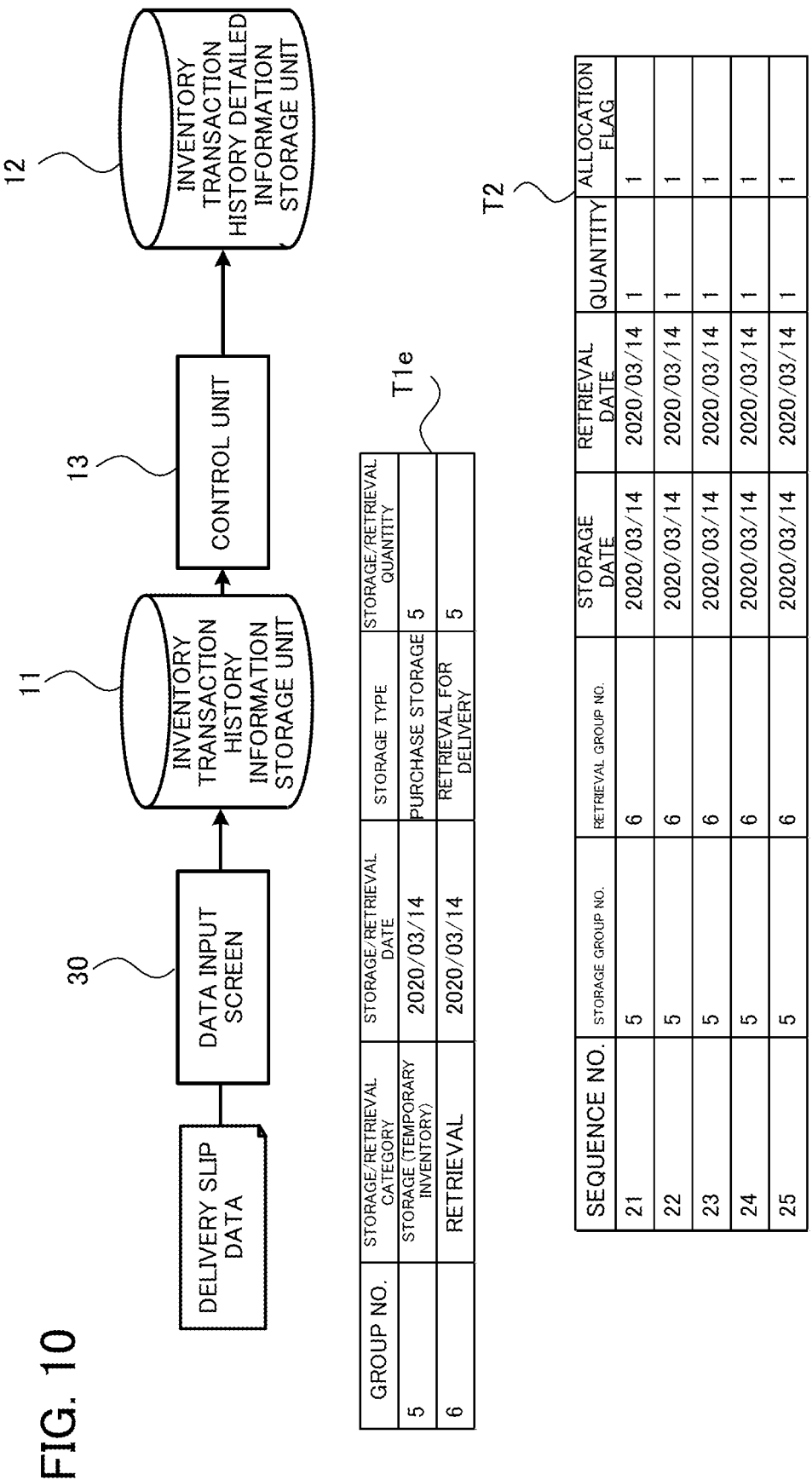
FIG. 10 is a view for explaining a non-inventory purchase and retrieval process according to the first embodiment.

FIG. 10 is a view for explaining a non-inventory purchase and retrieval process according to the first embodiment.

When receiving a request to purchase and retrieve five non-inventory items X on Mar. 14, 2020, the user issues a delivery slip for the items X. At this time, the user does not retrieve five items X from inventory, but performs a purchase process at the time of issuing the slip and then performs a retrieval process of the purchased items without storing them. The user operates the history management apparatus 1 to display the data input screen 30 on the monitor 104a. Using the data input screen 30, the user enters the non-inventory purchase and retrieval quantity "5" of the items X into the history management apparatus 1.

When receiving the entry, the control unit 13 creates an inventory transaction history information table T1e for group numbers "5" and "6," as illustrated in FIG. 10. The storage/retrieval category for the group number "5" is set to storage (temporary inventory).

In addition, the control unit 13 updates the inventory transaction history detailed information table T2 by assigning sequence numbers "21" to "25" to the fives purchased items X, respectively. With respect to each record with the assigned sequence numbers "21" to "25," the control unit 13 sets "Mar. 14, 2020" in the inventory transaction history retrieval date field and also sets "5" that is the group number assigned for the storage/retrieval category of "storage (temporary inventory)" in the inventory transaction history information table T1e, in the storage group number field. In addition, the control unit 13 sets "6" that is the group number assigned for the storage/retrieval category of "retrieval" in the inventory transaction history information table T1e, in the retrieval group number field. In addition, the control unit 13 sets "1" in the allocation flag fields of these records.

<Return Process>

Figure 11:
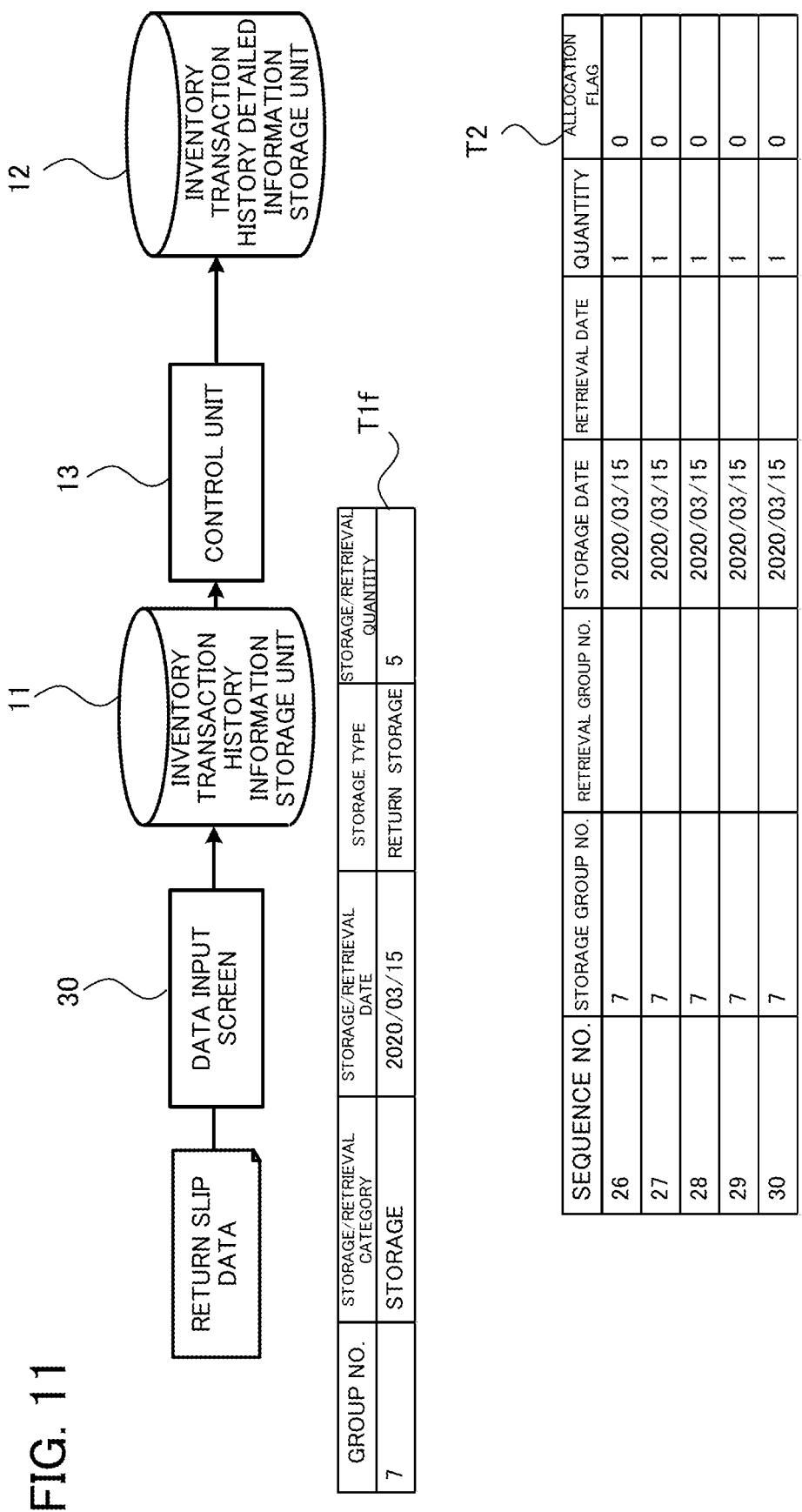
FIG. 11 is a view for explaining a return process according to the first embodiment.

FIG. 11 is a view for explaining a return process according to the first embodiment.

When receiving, on Mar. 15, 2020, a return request for five items X delivered on Mar. 14, 2020, the user issues a return slip for the items X. The user operates the history management apparatus 1 to display the data input screen 30 on the monitor 104a. Using the data input screen 30, the user enters the return storage quantity "5" of the items X into the history management apparatus 1.

When receiving the entry, the control unit 13 creates an inventory transaction history information table T1*f* for group number "7." The storage type in the inventory transaction history information table T1*f* is set to "return storage."

In addition, the control unit 13 updates the inventory transaction history detailed information table T2 by assigning sequence numbers "26" to "30" to the five returned items X, respectively. With respect to each record with the assigned sequence numbers "26" to "30," the control unit 13 sets "Mar. 15, 2020" in the storage date field, and also sets "7" that is the group number set in the inventory transaction history information table T1*f*, in the storage group number field.

<Return Process (Return to Supplier)>

Figure 12:
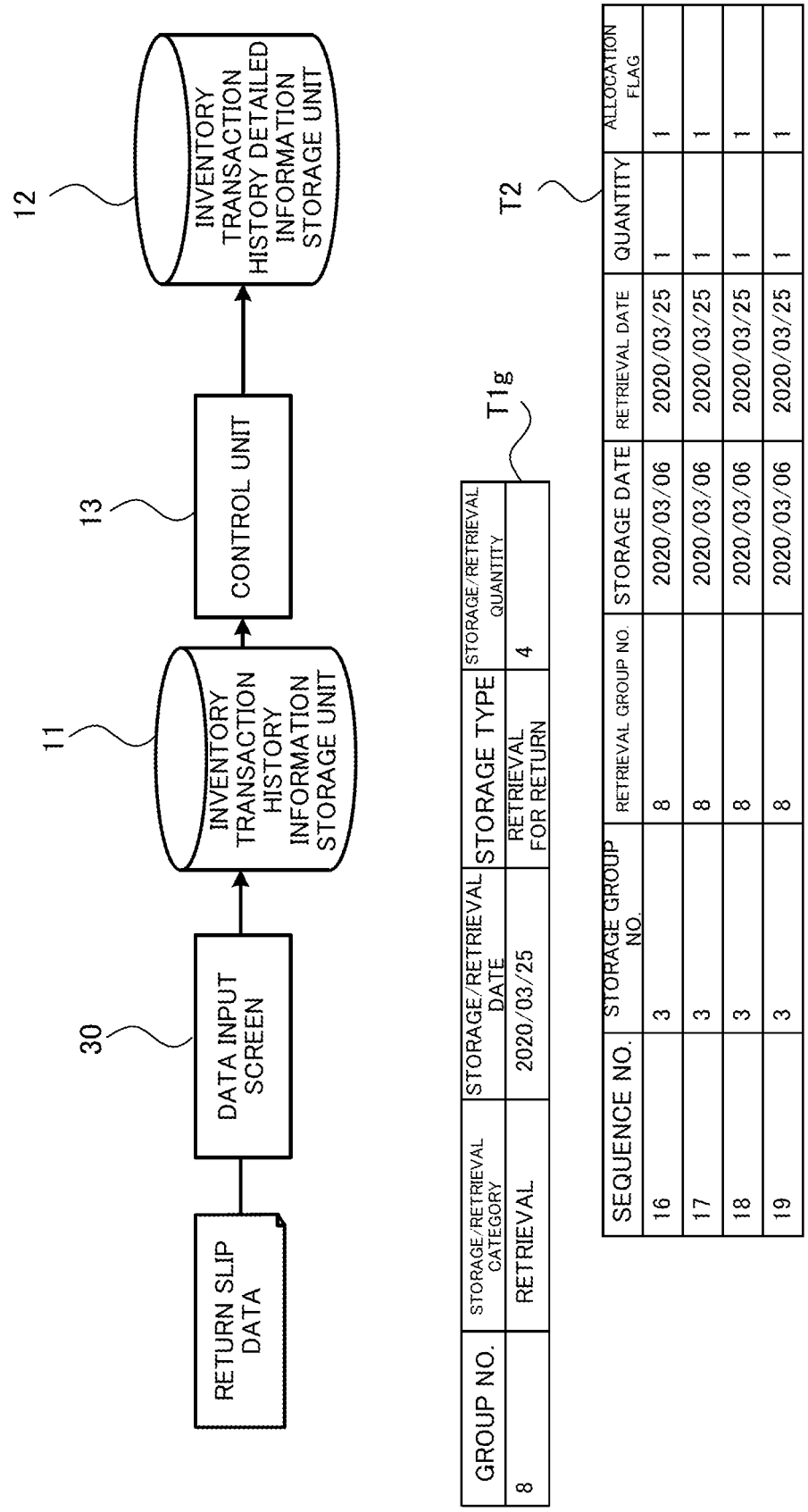
FIG. 12 is a view for explaining a return process (return to supplier) according to the first embodiment.

FIG. 12 is a view for explaining a return process (return to supplier) according to the first embodiment.

The user issues a return slip to return 4 items X from inventory to the supplier on Mar. 25, 2020. The user operates the history management apparatus 1 to display the data input screen 30 on the monitor 104*a*. Using the data input screen 30, the user enters the return retrieval quantity "4" of the items X into the history management apparatus 1.

When receiving the entry, the control unit 13 creates an inventory transaction history information table T1*g* for group number "8," as illustrated in FIG. 12. The storage type in the inventory transaction history information table T1*g* is set to "retrieval for return."

In addition, the control unit 13 refers to the inventory transaction history detailed information table T2 to extract four records in ascending order of sequence number from records that have not been assigned retrieval group numbers. Referring to FIG. 12, the records with sequence numbers "16" to "19" are extracted.

The control unit 13 updates the inventory transaction history detailed information regarding the four items X of the extracted sequence numbers "16" to "19." More specifically, with respect to each record with the sequence numbers "16" to "19" in the inventory transaction history detailed information table T2, the control unit 13 sets "Mar. 25, 2020" in the inventory transaction history retrieval date field and also sets "8" that is the group number set in the inventory transaction history information table T1*g*, in the retrieval group number field. In addition, the control unit 13 sets "1" in the allocation flag fields of these records.

The above transactions are made in March, 2020. At the end of March, 2020, the user enters an inventory status check for the items X as of the end of March into the history management apparatus 1. The control unit 13 refers to the inventory transaction history detailed information table T2 to display an inventory status as of the end of March 2020, which is a collection of records with the allocation flags of 0, on the monitor 104*a*.

Figure 13:
FIG. 13 illustrates a year-end inventory status.

FIG. 13 illustrates a year-end inventory status.

The inventory status screen 40 illustrated in FIG. 13 has the following fields: sequence number, group number, storage date, and quantity. The inventory status screen 40 enables the user to easily confirm if there is no difference between the history and the inventory quantity.

When the month has changed, the user performs the inventory check process to confirm the monthly inventory status.

As described above, the history management apparatus 1 includes a first storage unit (inventory transaction history information storage unit 11) that stores a first information record (inventory transaction history information) associating the quantity of a management target (item, material, or another) with a unique first number (group number), and a control unit 13 that stores, in a second storage unit (inventory transaction history detailed information storage unit 12), a second information record (inventory transaction history detailed information) assigning a unique second number (sequence number) and a unique first flag indicating the existence of the management target to each preset quantity of the management target with respect to the quantity of the management target, that stores, in response to a decrease in the quantity of the management target, the decreased quantity of the management target in association with a new first number in the first storage unit and changes, to a second flag indicating the absence of the management target, each first flag included in second information records which are stored in the second storage unit and the number of which is equal to the decreased quantity of the management target.

Therefore, for a consistency check of inventory data, the user is able to track the inventory flow from storage to retrieval for each quantity of one from the inventory transaction history and to check if the history matches the inventory quantity.

For example, in the case where electronic data of a delivery destination exists, the electronic data of the delivery destination and the inventory transaction history are compared with each other in terms of purchase slip number, product number, and quantity. By doing so, it is possible to display a list of inconsistent data (that is, data that is included in the electronic data but is not included in the inventory transaction history and data that is included in the inventory transaction history but is not included in the electronic data). Even if no electronic data of the delivery destination exists, slips or the like received from the delivery destination and the like may be used to make a comparison in terms of purchase slip number, product number, and quantity. By doing so, it is possible to display a list of inconsistent data.

In addition, if there is a difference between actual inventory data and inventory quantity, it is possible to track in which stage the difference occurred.

In addition, using electronic data and others, it is possible to make a comparison against a history to detect misconduct or the like.

In addition, it is possible to confirm an inventory flow in the following patterns.

From normal purchase to delivery sales.
Inventory storage process.
Inventory retrieval process.
A history indicating that, in the delivery sales, non-inventory is purchased at the time of sales and is delivered without being stored (temporary inventory process).

Second Embodiment

The following describes a history management apparatus according to the second embodiment.

Hereinafter, with respect to the history management apparatus of the second embodiment, different features from the above-described first embodiment will be mainly described and the description of the same features will be omitted.

The history management apparatus of the second embodiment manages a history of materials for production and final products.

Figure 14:
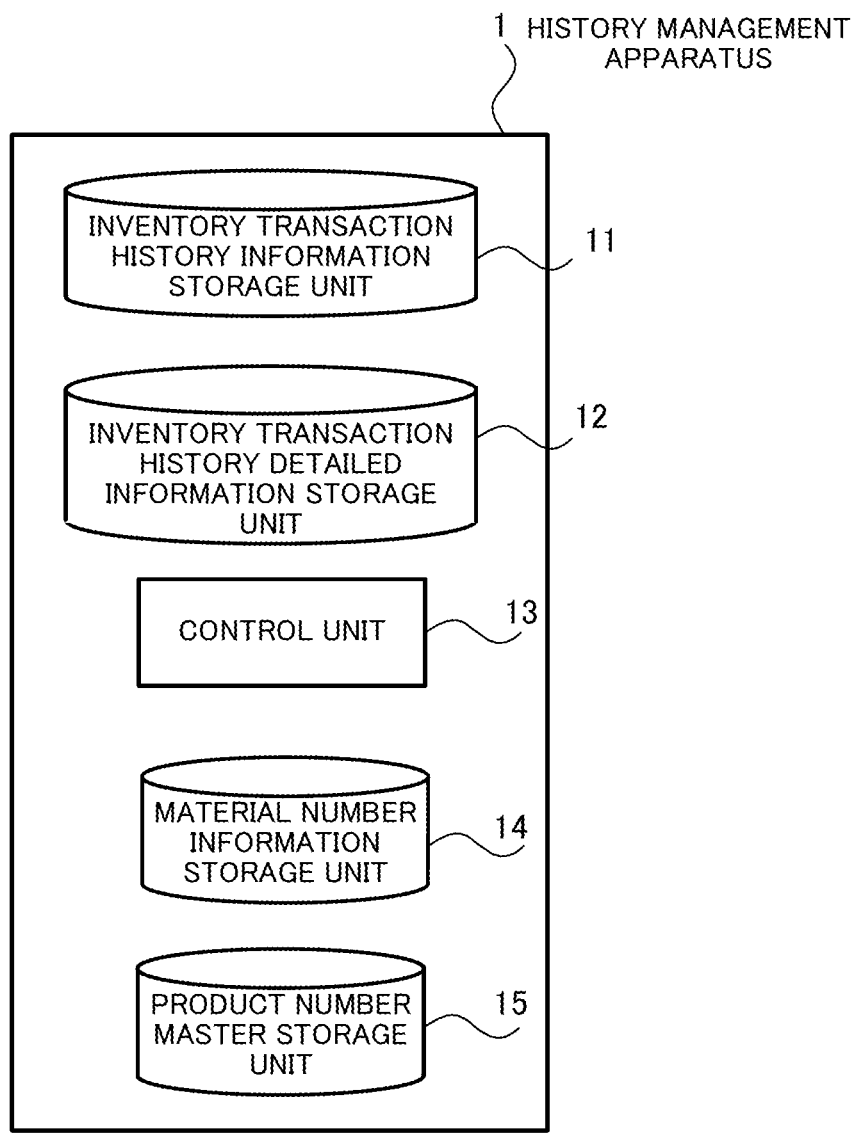
FIG. 14 is a block diagram illustrating functions of a history management apparatus according to a second embodiment.

FIG. 14 is a block diagram illustrating functions of a history management apparatus according to the second embodiment.

The history management apparatus 1 additionally includes a material number information storage unit 14 and a product number master storage unit 15.

Figure 15:
FIG. 15 illustrates an example of information that is stored in a material number information storage unit.

FIG. 15 illustrates an example of information that is stored in the material number information storage unit.

The material number information table T3 illustrated in FIG. 15 has the following fields: material number (No.), base unit, and minimum usage quantity. Information pieces arranged in a horizontal direction are associated with each other.

The material number field contains information identifying the material number of a material. The base unit field contains the unit of measurement for the material. By numbering sequences each defining a base unit of weight g, volume cc, final products are identified by the sequence numbers, irrespective of the kinds of used materials, and the amount of raw materials used and the amount of remaining materials are managed by the sequence numbers. That is, the raw materials are managed without any problems, irrespective of whether the raw materials are solids, liquids, or gases.

The minimum usage quantity field contains the quantity of a material that is used at a time. For example, 100 g of the material with material number A is used at a time.

In this connection, the material number information table T3 illustrated in FIG. 15 is just an example, and any desired data items may be added, changed, and deleted.

FIG. 16 illustrates an example of information that is stored in a product number master storage unit.

The product number master table T4 and product number master table T4a illustrated in FIG. 16 each have the following fields: product number, material number, and usage quantity. Information pieces arranged in a horizontal direction are associated with each other.

The product number field contains information identifying the product number of a final product. The material number field contains information identifying the material number of a material used for producing the product indicated in the product number field. The usage quantity field contains the quantity of the material used for producing a single product indicated in the product number field. For example, the product number master table T4 illustrated in FIG. 16 indicates that, to produce a single product with product number ABCD-1234, 500 g of a material with material number A, 50 g of a material with material number B, and 20 g of a material with material number C are used. Similarly, the product number master table T4a indicates that, to produce a single product with product number YXZ-999, 20 g of a material with material number D and 20 cc of a material with material number E are used.

These material number information table T3, product number master table T4, and product number master table T4a may be stored in advance or may be stored at certain timing.

Figure 17:
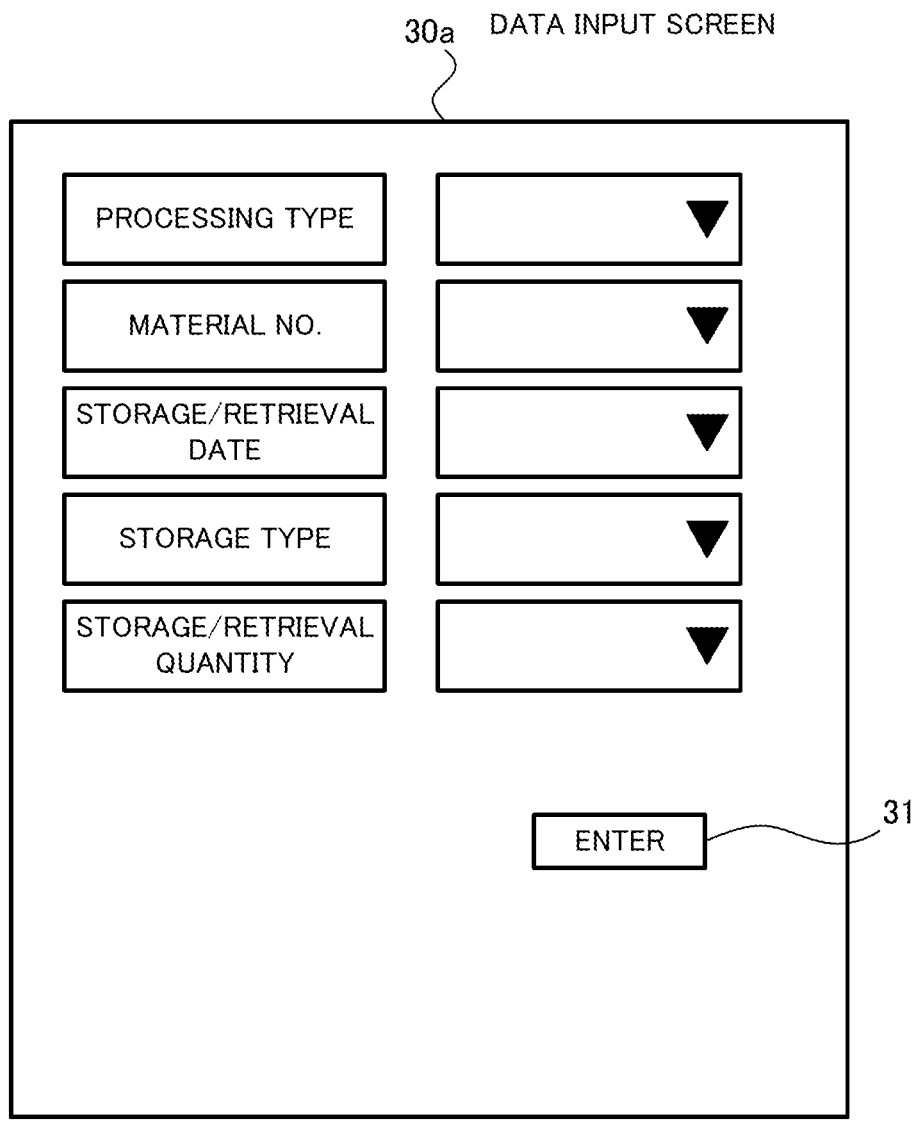
FIG. 17 illustrates an example of a data input screen according to the second embodiment.

FIG. 17 illustrates an example of a data input screen according to the second embodiment.

The data input screen 30a of FIG. 17 has the following fields: processing type, material number, storage/retrieval date, storage type, and storage/retrieval quantity.

Concrete Example

FIGS. 18 to 22 are views for explaining a concrete example of a history management method according to the second embodiment.

The following example describes inventory transaction sequences of materials with material numbers A, B, C, D, and E. Assume that the creation of history information starts on Apr. 1, 2020.

<Inventory Check Process>

Figure 18:
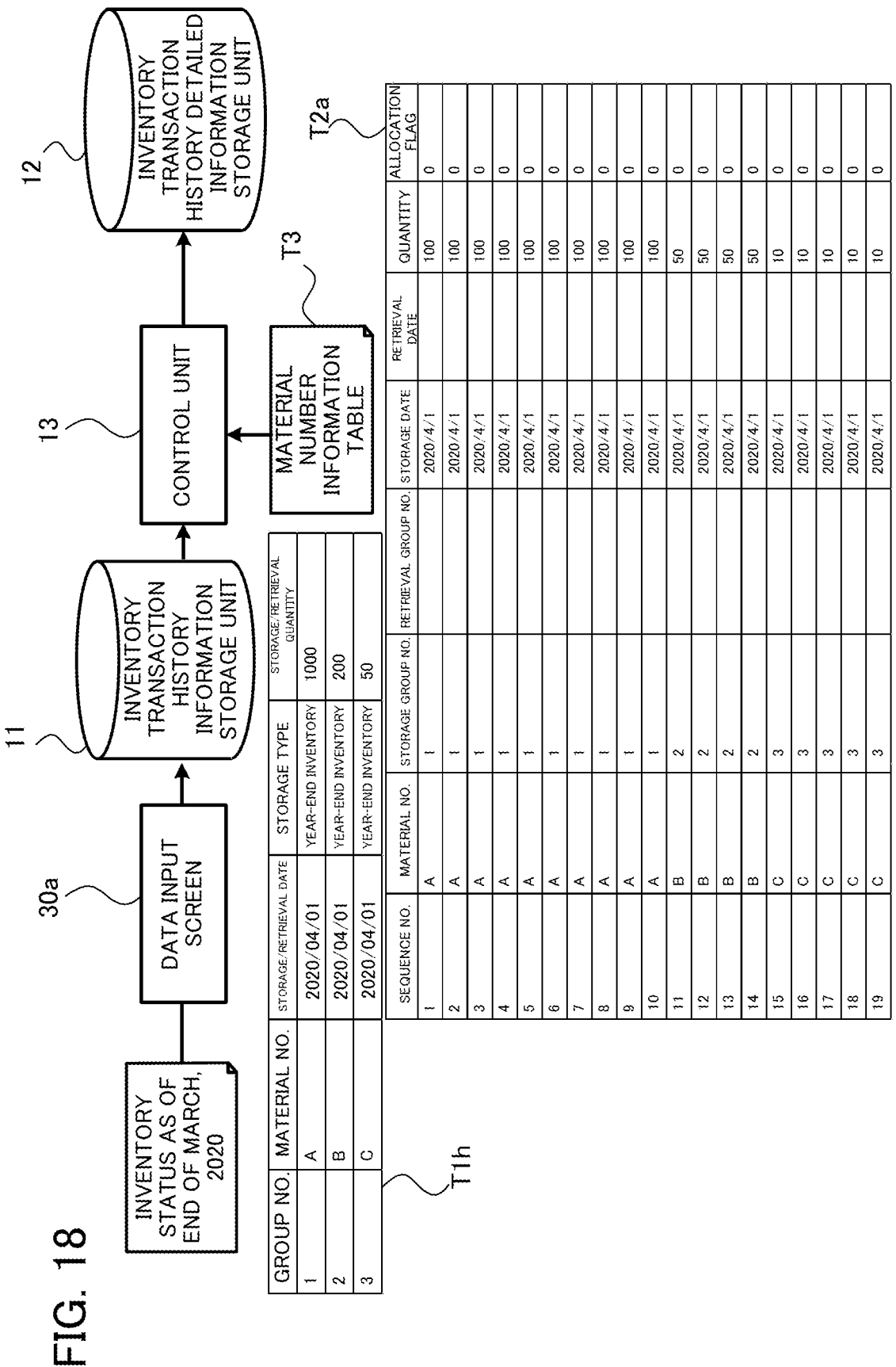
FIG. 18 is a view for explaining an inventory check process according to the second embodiment.

FIG. 18 is a view for explaining an inventory check process according to the second embodiment.

As of Apr. 1, 2020, the inventory quantity of the material with material number A is "1000," the inventory quantity of the material with material number B is "200," and the inventory quantity of the material with material number C is "50." The user operates the history management apparatus 1 to display the data input screen 30a on the monitor 104a. Using the data input screen 30a, the user enters, into the history management apparatus 1, the inventory quantity "1000" of the material number A, the inventory quantity "200" of the material number B, and the inventory quantity "50" of the material number C.

As illustrated in FIG. 18, the control unit 13 creates an inventory transaction history information table T1h for group numbers "1" to "3" that are respectively assigned to the material numbers.

In addition, the control unit 13 refers to the material number information table T3 to create an inventory transaction history detailed information table T2a in which a different sequence number "1" to "19" is assigned to each quantity of "100" for the material number A, to each quantity of "50" for the material number B, and to each quantity of "10" for the material number C on the basis of the minimum usage quantities corresponding to the material numbers. In addition, the control unit 13 sets "1" to "3" that are the group numbers set for the material numbers in the inventory transaction history information table T1h, in the storage group number fields of the corresponding records. The control unit 13 also sets "0" in the allocation flag fields of these records.

<Normal Production and Retrieval Process>

Figure 19:
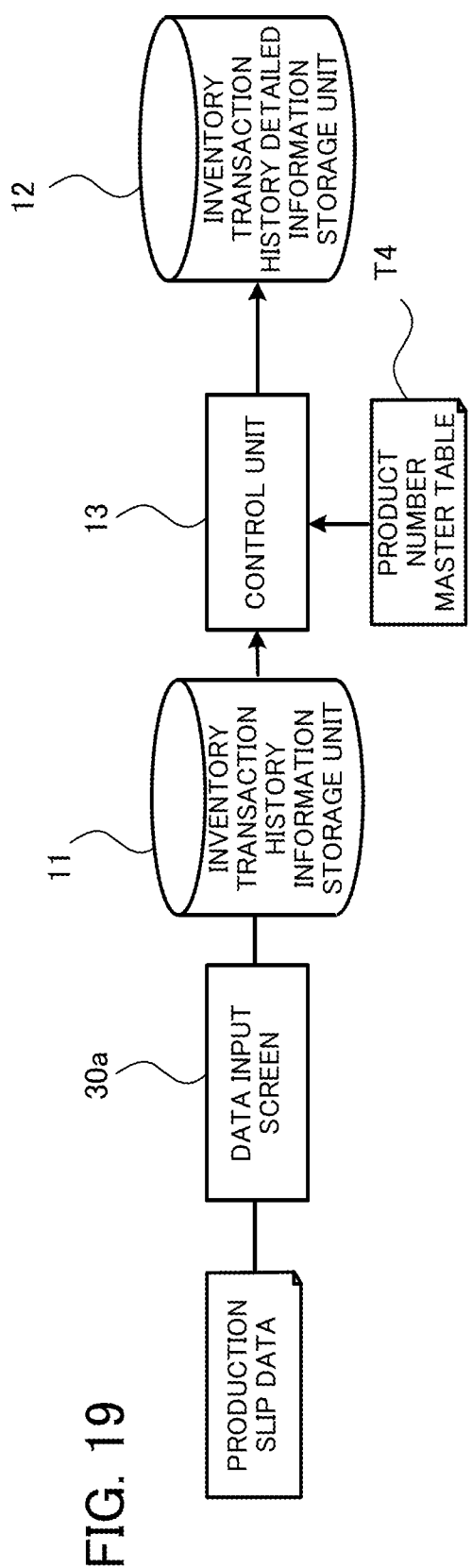
FIG. 19 is a view for explaining a normal production and retrieval process according to the second embodiment.

FIG. 19 is a view for explaining a normal production and retrieval process according to the second embodiment.

When receiving a request to produce one item with product number ABCD-1234 (hereinafter, referred to as "item X") on Apr. 5, 2020, the user issues a production slip for the item X. The user operates the history management apparatus 1 to display the data input screen 30a on the monitor 104a. Using the data input screen 30a, the user enters the production quantity "1" of the item X into the history management apparatus 1.

When receiving the entry, the control unit 13 refers to the product number master table T4. The control unit 13 creates an inventory transaction history information table T1i for group numbers "4" to "6." In addition, the control unit 13 refers to the inventory transaction history detailed information table T2a to allot records for each material number on the basis of the material usage quantity registered in the product number master.

More specifically, since the usage quantity of the material number A is "500" and the quantity fields of the records for the material number A contain "100," the control unit 13 extracts five records in ascending order of sequence number from records that have not been assigned retrieval group numbers. Referring to FIG. 19, the records with sequence numbers "1" to "5" are extracted.

The control unit 13 updates the inventory transaction history detailed information regarding the material number A of the five extracted sequence numbers "1" to "5." More specifically, with respect to each record with the sequence numbers "1" to "5" in the inventory transaction history detailed information table T2*a*, the control unit 13 sets "Apr. 5, 2020" in the inventory transaction history retrieval date field and also sets "4" that is the group number set in the inventory transaction history information table T1*i*, in the retrieval group number field. The control unit 13 then sets "1" in the allocation flag fields of these records. The control unit 13 does the same process for the material numbers B and C.

<Inventory Storage Process>

Figure 20:
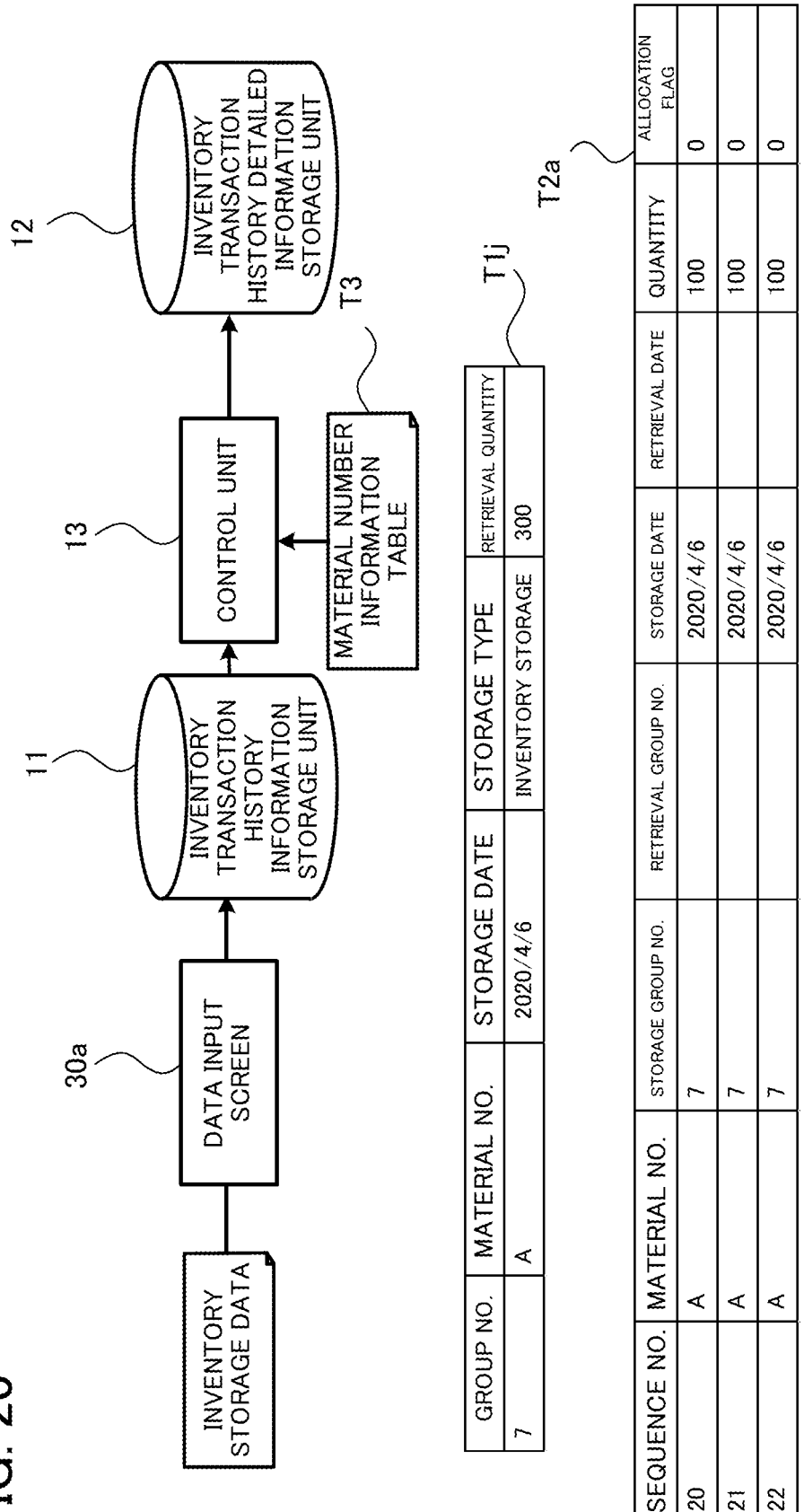
FIG. 20 is a view for explaining an inventory storage process according to the second embodiment.

FIG. 20 is a view for explaining an inventory storage process according to the second embodiment.

When 300 materials with material number A are stored for inventory on Apr. 6, 2020, the user operates the history management apparatus 1 to display the data input screen 30*a* on the monitor 104*a*. Using the data input screen 30*a*, the user enters the storage quantity "300" of the material number A into the history management apparatus 1.

When receiving the entry, the control unit 13 creates an inventory transaction history information table T1*j* for group number "7," as illustrated in FIG. 20. In addition, the control unit 13 refers to the material number information table T3 and updates the inventory transaction history detailed information table T2*a* by assigning a different sequence number "20" to "22" to each quantity of "100" for the material number A on the basis of the minimum usage quantity corresponding to the material number. The control unit 13 also sets "7" that is the group number set in the inventory transaction history information table T1*j*, in the storage group number fields of these records.

<Normal Production and Retrieval Process>

Figure 21:
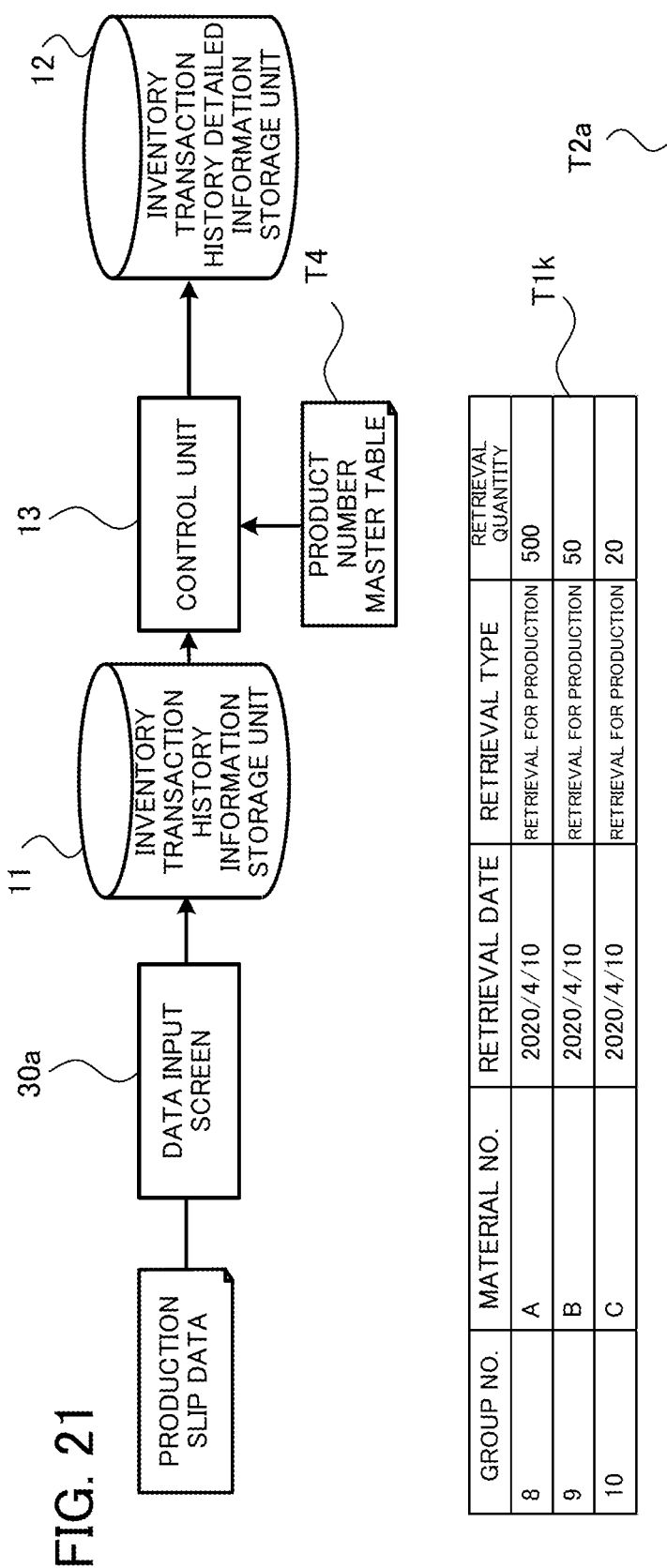
FIG. 21 is a view for explaining a normal production and retrieval process according to the second embodiment.

FIG. 21 is a view for explaining a normal production and retrieval process according to the second embodiment.

When receiving a request to retrieve one item X on Apr. 10, 2020, the user issues a production slip for the item X and produces one item X using inventory. The user operates the history management apparatus 1 to display the data input screen 30*a* on the monitor 104*a*. Using the data input screen 30*a*, the user enters the production quantity "1" of the item X into the history management apparatus 1.

When receiving the entry, the control unit 13 refers to the product number master table T4. The control unit 13 creates an inventory transaction history information table T1*k* for group numbers "8" to "10." In addition, the control unit 13 refers to the inventory transaction history detailed information table T2*a* to allocate records for each material number on the basis of the material usage quantities registered in the product number master.

More specifically, since the usage quantity of the material number A is "500" and the quantity fields of the records with material number A contain "100," the control unit 13 extracts five records in ascending order of sequence number from records that have not been assigned retrieval group numbers. Referring to FIG. 21, the records with sequence numbers "6" to "10" are extracted.

The control unit 13 updates the inventory transaction history detailed information regarding the material number A of the five extracted sequence numbers "6" to "10." More specifically, with respect to each record with the sequence numbers "6" to "10" in the inventory transaction history detailed information table T2*a*, the control unit 13 sets Apr. 10, 2020 in the inventory transaction history retrieval date field, and also sets "8" that is the group number set in the inventory transaction history information table T1*k*, in the retrieval group number field. The control unit 13 also sets "1" in the allocation flag fields of these records. The control unit 13 does the same process for the material numbers B and C.

<Non-Inventory Material Purchase and Retrieval Process>

Figure 22:
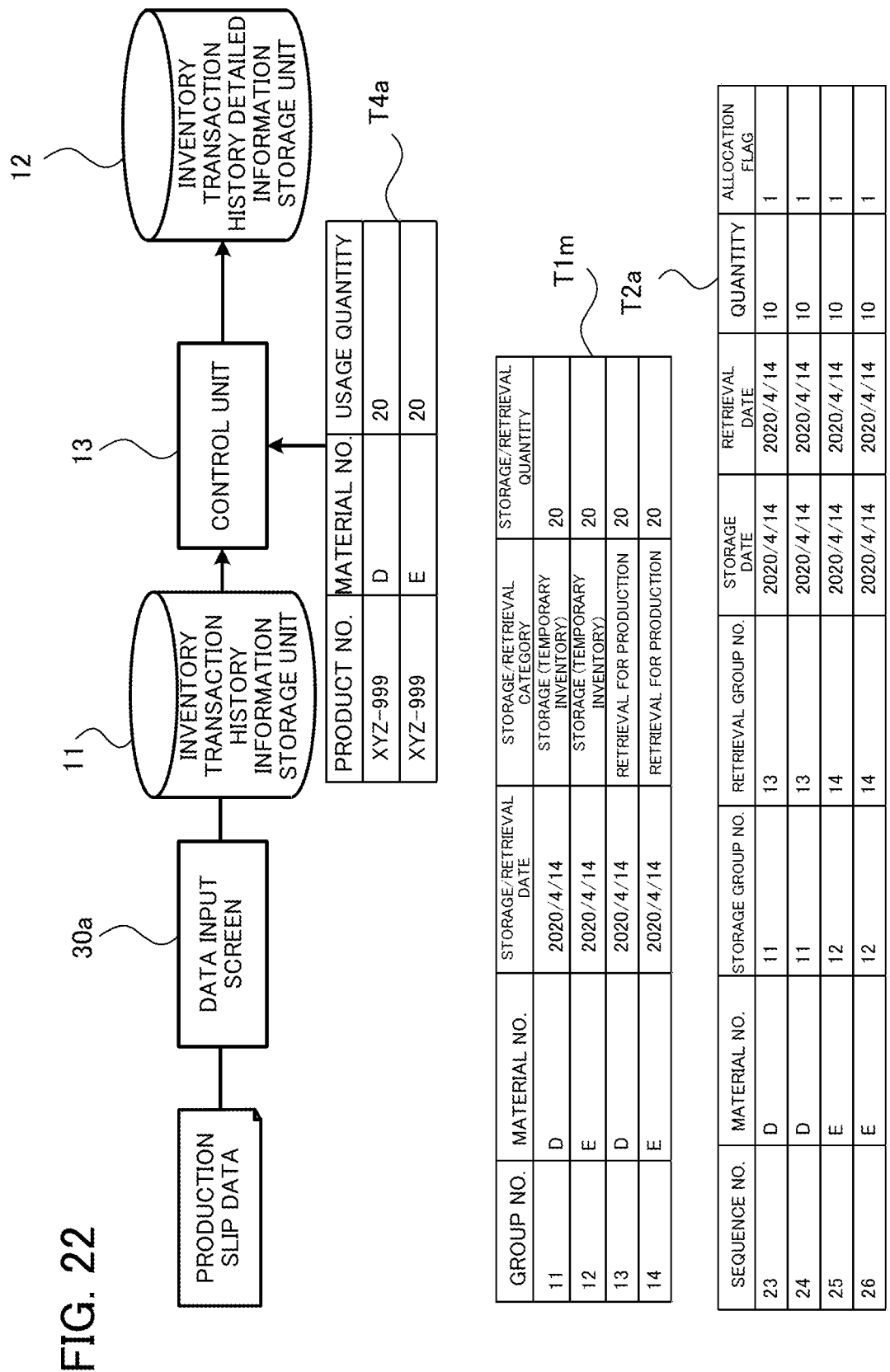
FIG. 22 is a view for explaining a non-inventory material purchase and retrieval process according to the second embodiment.

FIG. 22 is a view for explaining a non-inventory material purchase and retrieval process.

When receiving a non-inventory material purchase and retrieval request for one item with product number XYZ-999 (hereinafter, referred to as "item Y") on Apr. 14, 2020, the user issues a production slip for the item Y. At this time, the user does not retrieve materials for one item Y from inventory but performs a purchase process at the time of issuing the slip and then retrieves the purchases without storing it. The user operates the history management apparatus 1 to display the data input screen 30*a* on the monitor 104*a*. Using the data input screen 30*a*, the user enters the non-inventory material purchase and retrieval quantity "1" of the item Y into the history management apparatus 1.

When receiving the entry, the control unit 13 refers to the product number master table T4*a*. The control unit 13 then creates an inventory transaction history information table T1*m* for group numbers "11" to "14," as illustrated in FIG. 22. Here, in the inventory transaction history table T1*m*, the storage/retrieval category for the group numbers "11" and "12" are set to "storage (temporary inventory), and the storage/retrieval category for the group numbers "13" and "14" are set to "retrieval for production."

The control unit 13 updates the inventory transaction history detailed information table T2*a* by assigning sequence numbers "23" to "26" for 20 g of the purchased material with material number D. In addition, with respect to each record with the assigned sequence numbers "23" and "24," the control unit 13 sets Apr. 14, 2020 in the inventory transaction history retrieval date field and also sets "11" that is the group number set in the inventory transaction history information table Tim, in the storage group number. Also, the control unit 13 sets "13" that is the group number set in the inventory transaction history information table Tim, in the retrieval group number field. The control unit 13 sets "1" in the allocation flag fields of these records. The control unit 13 does the same process for the sequence numbers "25" and "26."

<Return Process (Return to Supplier)>

Figure 23:
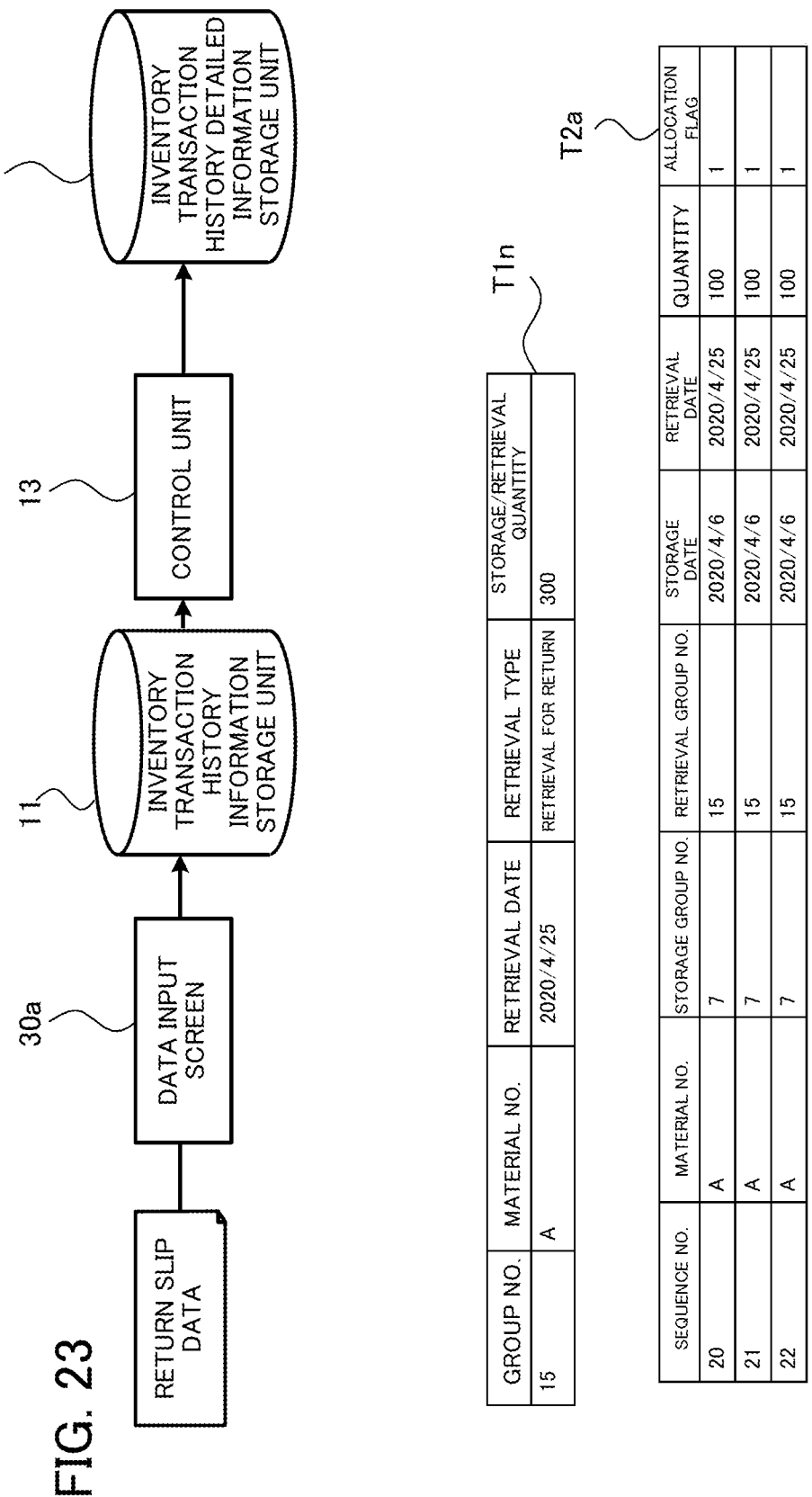
FIG. 23 is a view for explaining a return process (return to supplier) according to the second embodiment.

FIG. 23 is a view for explaining a return process (return to supplier) according to the second embodiment.

The user issues a return slip to return 300 materials with material number A from inventory to their supplier on Apr. 25, 2020. The user operates the history management apparatus 1 to display the data input screen 30*a* on the monitor 104*a*. Using the data input screen 30*a*, the user enters the return retrieval quantity "300" of the material number A into the history management apparatus 1.

When receiving the entry, the control unit 13 creates an inventory transaction history information table Tin for group number "15," as illustrated in FIG. 23. The retrieval type is set to "retrieval for return" in the inventory transaction history information table Tin.

In addition, the control unit 13 updates the inventory transaction history detailed information table T2*a* by assigning sequence numbers "20" to "22" to the 300 returned materials with material number A. The control unit 13 then refers to the inventory transaction history detailed information table T2*a* to extract three records in ascending order of sequence number from records that have not been assigned retrieval group numbers. Referring to FIG. 23, the records with sequence numbers "20" to "22" are extracted.

The control unit 13 updates the inventory transaction history detailed information regarding the 300 materials with material number A of the extracted sequence numbers "20" to "22." More specifically, with respect to each record with the sequence numbers "20" to "22" in the inventory transaction history detailed information table T2a, the control unit 13 sets Apr. 25, 2020 in the inventory transaction history retrieval date field, and also sets "15" that is the group number set in the inventory transaction history information table T1n, in the retrieval group number field. The control unit 13 also sets "1" in the allocation flag fields of these records.

The above transactions are made in April, 2020. At the end of April, 2020, the user enters an inventory status check for materials as of the end of April into the history management apparatus 1. The control unit 13 refers to the inventory transaction history detailed information table T2a to display an inventory status that is a collection of records with the allocation flags of "0" on the monitor 104a.

FIG. 24 illustrates a year-end inventory status according to the second embodiment.

The history management apparatus of the second embodiment produces the same effects as that of the first embodiment. That is, it is possible to check whether no difference has occurred between the history and the inventory quantity.

If a difference is found between actual inventory data and an inventory quantity, it is possible to track in which stage the difference occurred.

In addition, using electronic data and others, it is possible to make a comparison against a history to detect misconduct and others.

In addition, it is possible to confirm an inventory flow of materials in the following patterns.
Storage history for inventory.
Production history.
A history indicating that, in the production process, non-inventory parts are purchased and used for the production process without being stored (used as a temporary inventory process)

Third Embodiment

The following describes a history management apparatus according to a third embodiment.

Hereinafter, with respect to the history management apparatus of the third embodiment, different features from the above-described first and second embodiments will be mainly described and the description of the same features will be omitted.

The history management apparatus of the third embodiment is different from those of the first and second embodiments in that GPS control numbers are assigned in production management and logistics history in order to manage a flow of entities from production via storage to logistics.

With respect to the GPS control numbers of this embodiment, "1" is given to the head of a GPS control number when a material is stored, and "2" is given to the head of a GPS control number when a final product is stored. "0" is given for normal logistics storage (both inventory and non-inventory). "9" is given to the head of a GPS control number when a packing box is stored.

A final product is linked to the GPS control numbers of materials used for the final product, for each group number so that the materials used are traceable.

In the case where final products are made of the same materials but have different sizes, different product numbers are used for them.

In the case where final products are identical but packing boxes containing the products have different sizes, different product numbers are used for them. Different GPS control numbers are used accordingly.

With respect to the allocation flag, "0" is set for materials and products (both inventory and non-inventory) at the time of storage. With respect to the allocation at the time of retrieval of a material, an allocation flag of "1" is set to record that the material has been retrieved (used).

In the delivery sales, an allocation flag of "2" is set for the allocation at the time of retrieval of a final product and a purchased product to record that they have been retrieved. When it is confirmed via GPS tracking that a product has arrived at a delivery destination, an allocation flag of "3" is set to record that its delivery is complete.

Figure 25:
FIG. 25 illustrates an example of information that is stored in a material number information storage unit according to a third embodiment.

FIG. 25 illustrates an example of information that is stored in a material number information storage unit according to the third embodiment.

The material number information table T3a illustrated in FIG. 25 has the following fields: material number, base unit, and minimum usage quantity. Information pieces arranged in a horizontal direction are associated with each other.

For example, the material number information table T3a indicates that the base unit for material number A is gram, and the minimum usage quantity is 50 (50 g). In addition, the base unit for a packing box A is item and the minimum usage quantity is 1 (1 item).

FIG. 26 illustrates an example of information that is stored in a product number master storage unit according to the third embodiment.

The product number master table T4b of FIG. 26 indicates that, to produce one item with product number XYZ, 100 g of a material with material number A, 50 g of a material with material number B, 300 cc of a material with material number C, one packing box A, and one packing box B are used.

In addition, in the product number master table T4b, the size of a packing box (vertical×horizontal×height) is set in the base unit field for each packing box A and B.

Figure 27:
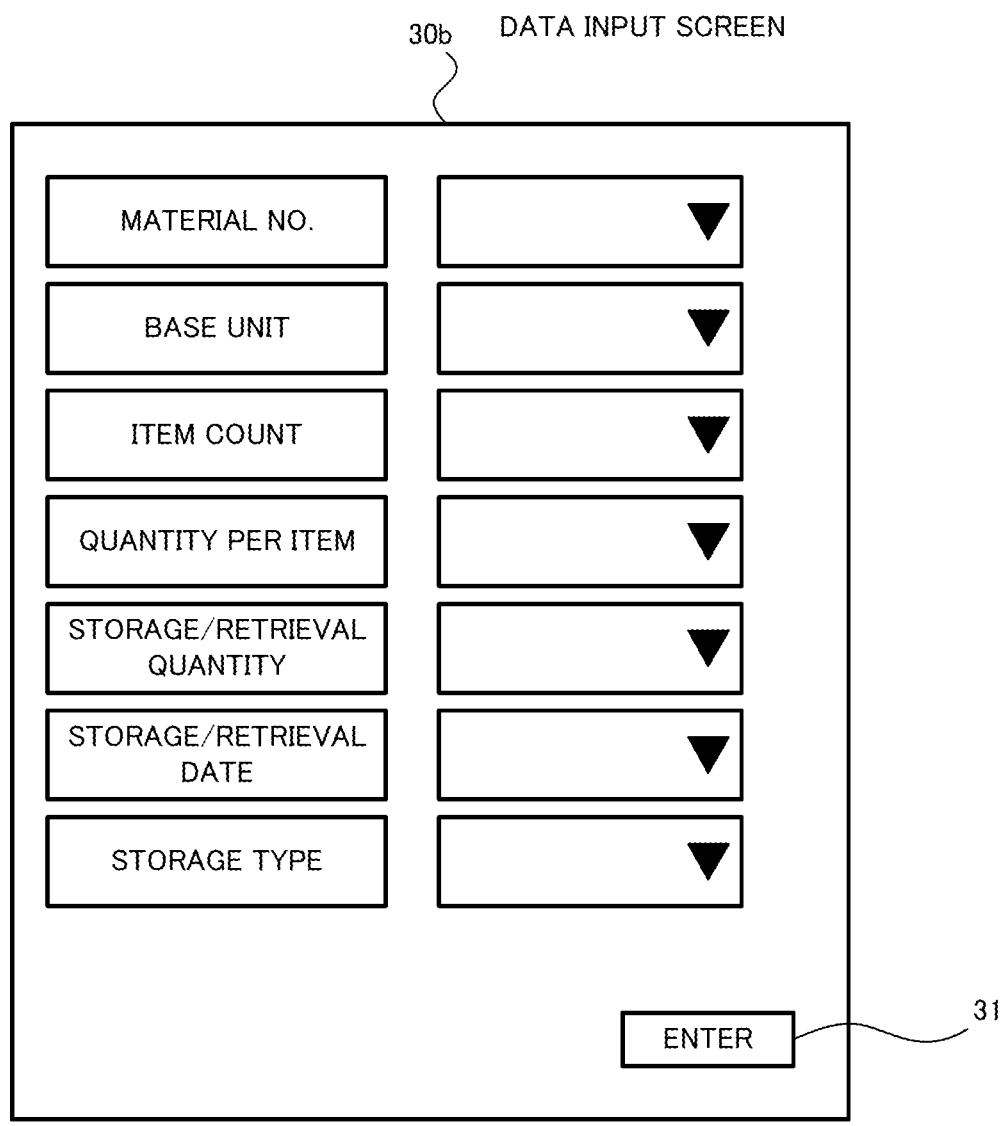
FIG. 27 is a view for explaining a data input screen according to the third embodiment.

FIG. 27 is a view for explaining a data input screen according to the third embodiment.

The data input screen 30b of FIG. 27 has the following fields: material number, base unit, item count, quantity per item, storage/retrieval quantity, storage/retrieval date, and storage type.

Figure 28:
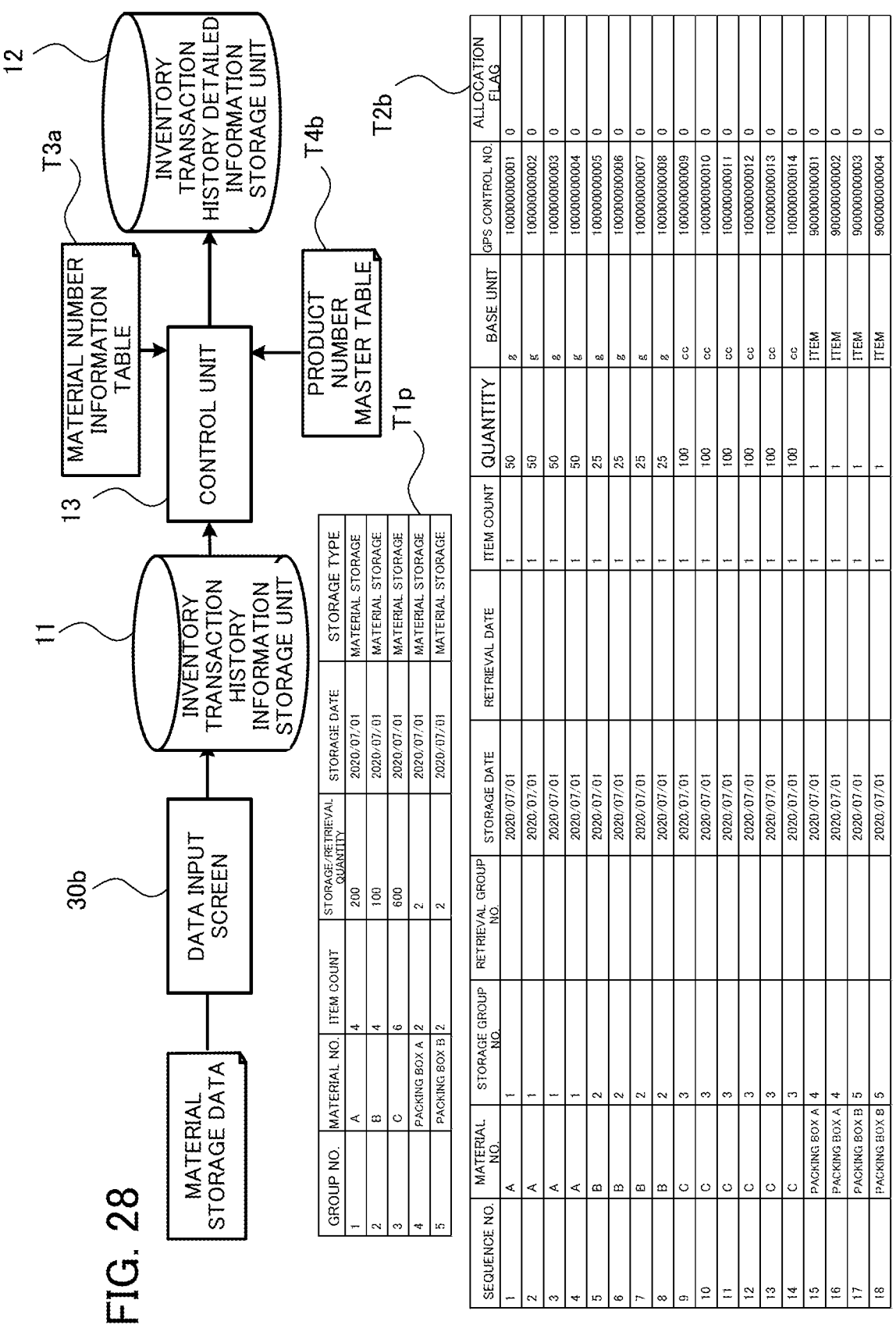
FIG. 28 illustrates an example of an inventory transaction history information table and an inventory transaction history detailed information table according to the third embodiment.

FIG. 28 illustrates an example of an inventory transaction history information table and inventory transaction history detailed information table according to the third embodiment.

Packing boxes are prepared for packing items XYZ according to their sizes, and a different sequence is assigned to each box.

As illustrated in an inventory transaction history detailed information table T2b, a sequence number and a GPS control number are given to each item count of one. Although not illustrated, GPS information (positional information) for each material number may be stored in the inventory transaction history detailed information table T2b.
<Production Material Storage Process>

To produce two items XYZ, materials A, B, and C and packing boxes A and B are purchased and stored.

Assume now that "200" materials with material number A, "100" materials with material number B, "600" materials with material number C, "1" packing box A, and "1" packing box B are purchased on Jul. 1, 2020.

With respect to the packing boxes, one packing box is used for each production quantity of "1." Therefore, in the case where the production quantity is "2," one product is packed in the packing box A and the other product is packed in the packing box B.

The user operates the history management apparatus 1 to display the data input screen 30b on the monitor 104a. Using the data input screen 30b, the user enters, into the history management apparatus 1, the purchase quantity "200" of the material number A, the purchase quantity "100" of the material number B, the purchase quantity "600" of the material number C, the purchase quantity "1" of the packing box A, and the purchase quantity "1" of the packing box B.

As illustrated in FIG. 28, the control unit 13 creates an inventory transaction history information table T1p in which a different group number "1" to "5" is assigned to each material number.

In addition, in the embodiment, the minimum usage quantity is registered for each material number in the material number information table T3a. Therefore, the control unit 13 refers to the inventory transaction history information table T1p, material number information table T3a, and product number master table T4b to create an inventory transaction history detailed information table T2b in which a different sequence number "1" to "18" is assigned to each quantity of "50" for the material number A, to each quantity of "25" for the material number B, to each quantity of "100" for the material number C, to each quantity of "1" for the packing box A, and to each quantity of "1" for the packing box B on the basis of the minimum usage quantities corresponding to the material numbers.

The control unit also sets "1" to "5" that are the group numbers set for the material numbers in the inventory transaction history information table T1p, in the storage group number fields of the corresponding records. The control unit 13 also sets a unique GPS control number in each of the GPS control number fields of the records. The control unit 13 also sets "0" in the allocation flag fields of the records.

<Normal Production and Retrieval Process and Product Storage Process>

Figure 29:
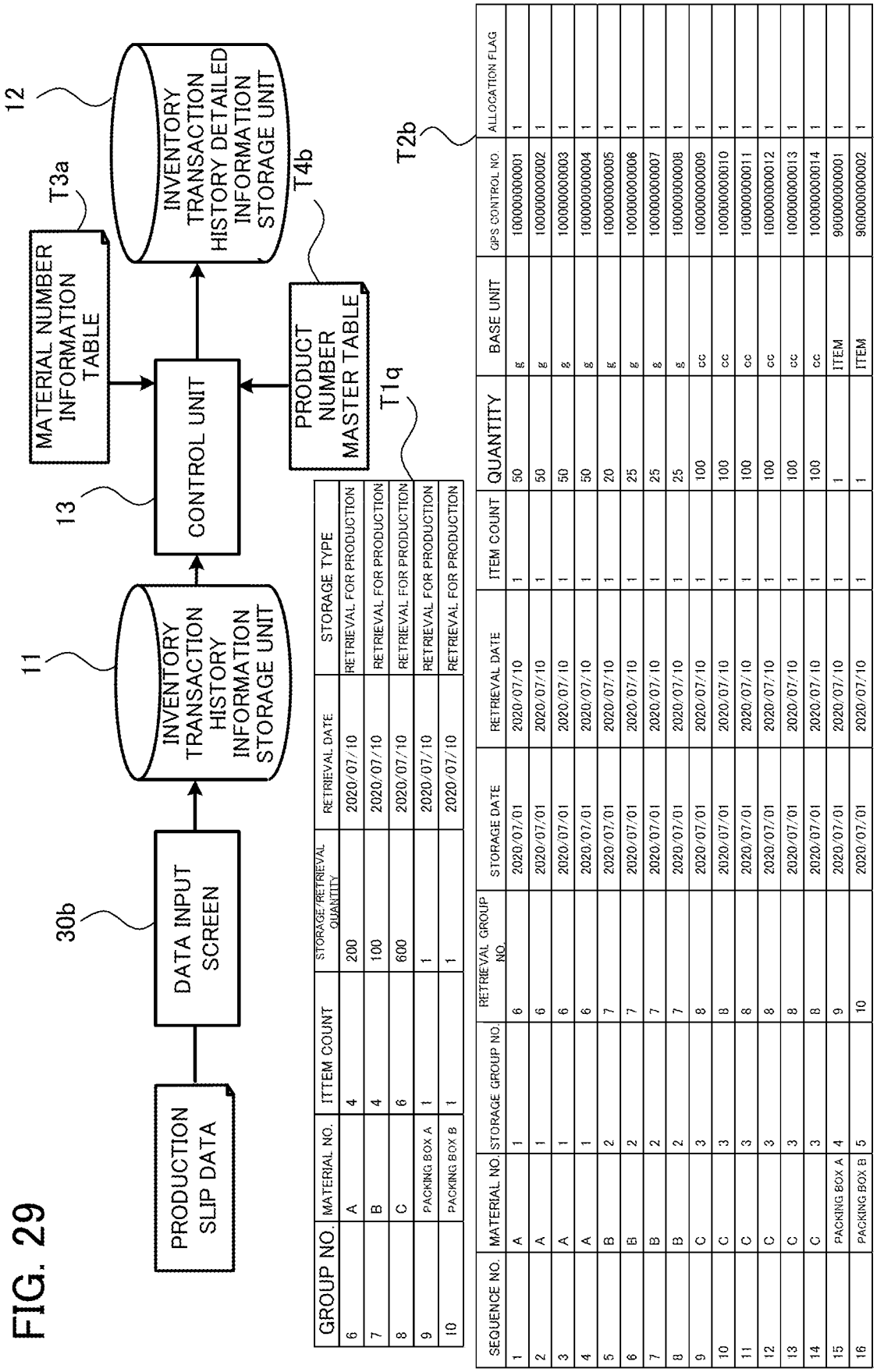
FIG. 29 is a view for explaining a normal production and retrieval process and a product storage process according to the third embodiment.
Figure 30:
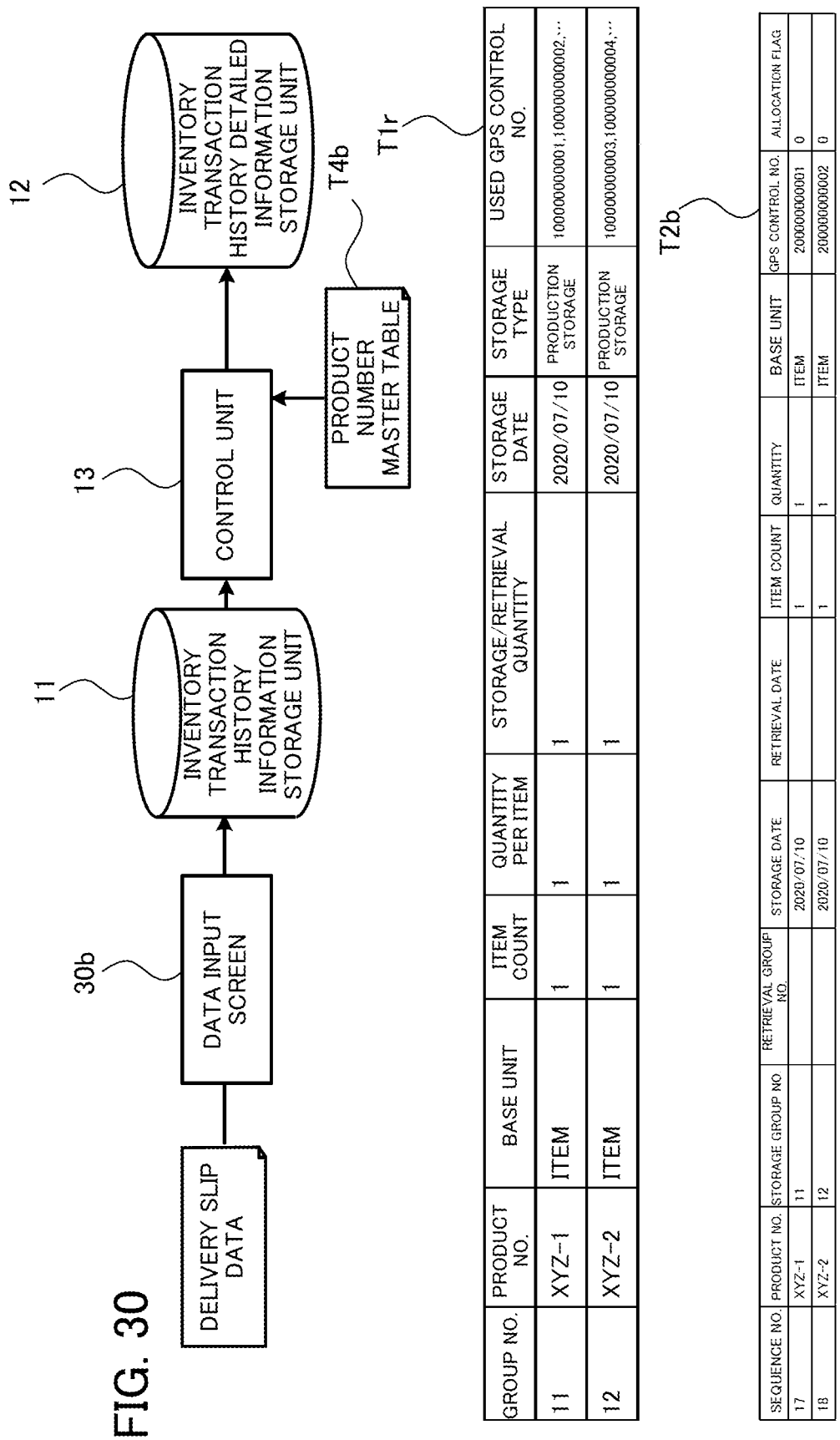
FIG. 30 is a view for explaining the normal production and retrieval process and the product storage process according to the third embodiment.

FIGS. 29 and 30 are views for explaining a normal production and retrieval process and product storage process according to the third embodiment.

When receiving a request to produce two items XYZ on Jul. 10, 2020, the user issues a production slip for the items XYZ. Then, the user operates the history management apparatus 1 to display the data input screen 30b on the monitor 104a. Using the data input screen 30b, the user enters the production quantity "2" of the items XYZ into the history management apparatus 1.

When receiving the entry, the control unit 13 creates an inventory transaction history information table T1q for group numbers "6" to "10." In addition, the control unit 13 refers to the inventory transaction history detailed information table T2b to allot records for each material number on the basis of the material number information table T3a and the material usage quantities registered in the product number master table T4b.

More specifically, since the usage quantity of the material number A is "200" and the quantity field of the record with material number A indicates "50," the control unit 13 extracts four records in ascending order of sequence number from records that have not been assigned retrieval group numbers. Referring to FIG. 29, the records with sequence numbers "1" to "4" are extracted.

The control unit 13 updates the inventory transaction history detailed information regarding the material number A of the four extracted sequence numbers "1" to "4." More specifically, with respect to each record with the sequence numbers "1" to "4" in the inventory transaction history detailed information table T2b, the control unit 13 sets Jul. 10, 2020 in the inventory transaction history retrieval date field and sets "6" that is the group number set in the inventory transaction history information table T1q, in the retrieval group number field. The control unit 13 also sets "1" in the allocation flag field. The control unit 13 does the same process for the material numbers B and C, packing box A, and packing box B.

Then, the control unit 13 creates an inventory transaction history information table T1r for group numbers "11" and "12" for the two final items XYZ, as illustrated in FIG. 30. The GPS control numbers of all materials used for producing an item XYZ are set in the used GPS control number field in the inventory transaction history information table T1r. The control unit 13 also updates the inventory transaction history detailed information table T2b by assigning sequence numbers "17" and "18" to the final items XYZ, respectively. The control unit 13 sets "11" and "12" that are the group numbers set in the inventory transaction history information table T1r, in the storage group number fields of the corresponding records and assigns unique GPS control numbers in the GPS control number fields.

<Inventory Storage Process>

Figure 31:
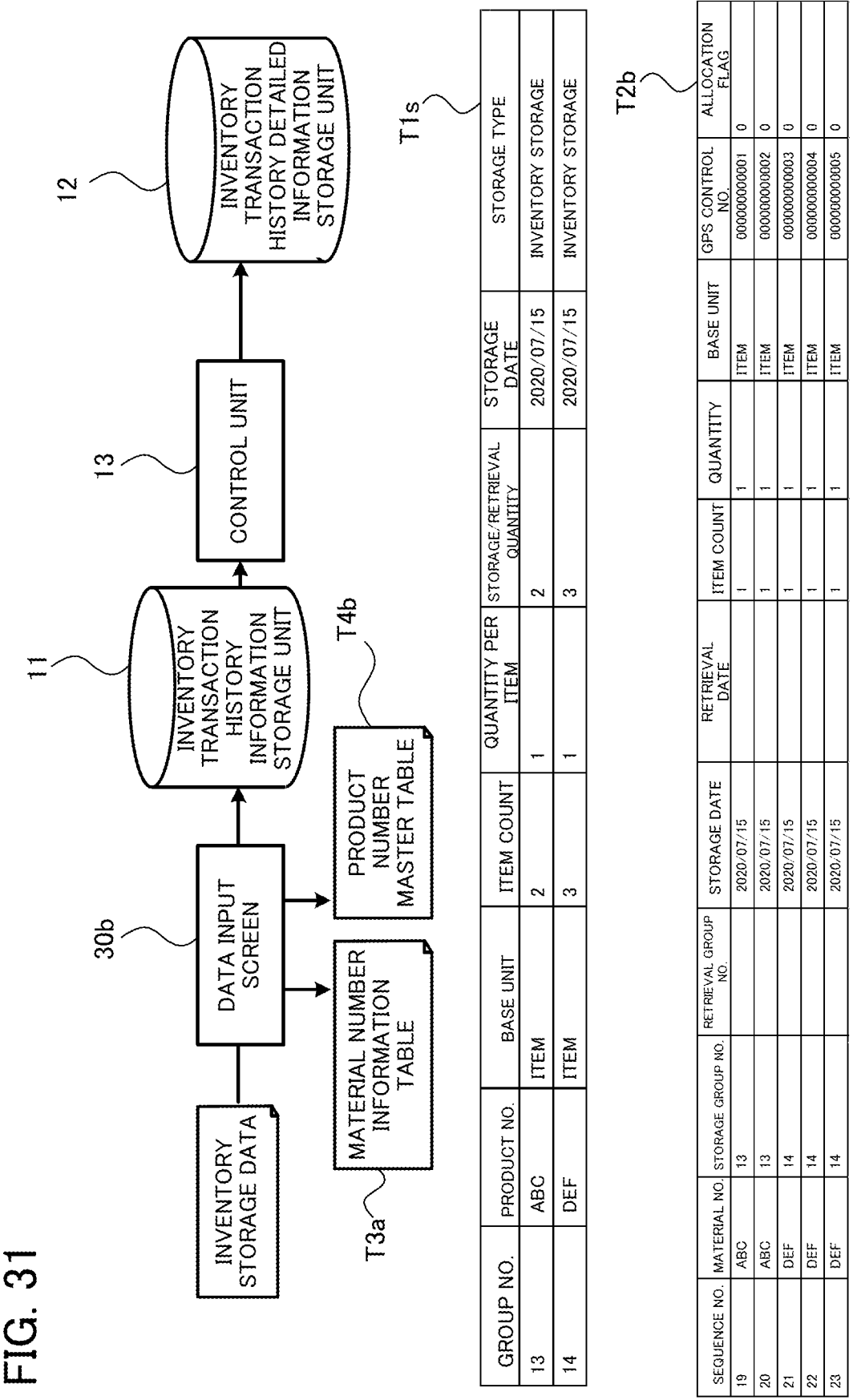
FIG. 31 is a view for explaining an inventory storage process according to the third embodiment.

FIG. 31 is a view for explaining an inventory storage process according to the third embodiment.

When two items ABC and three items DEF are stored for inventory on Jul. 15, 2020, the user operates the history management apparatus 1 to display the data input screen 30b on the monitor 104a. Using the data input screen 30b, the user enters the storage quantity "2" of the items ABC and the storage quantity "3" of the items DEF into the history management apparatus 1.

When receiving the entry, the control unit 13 updates the material number information table T3a and product number master table T4b. Then, the control unit 13 creates an inventory transaction history information table T1s for group numbers "13 and "14," as illustrated in FIG. 31. In addition, the control unit 13 updates the inventory transaction history detailed information table T2b by assigning sequence numbers "19" to "23" to the two stored items ABC and three stored items DEF, respectively. In addition, the control unit 13 sets "13" and "14" that are the group numbers set for the material numbers in the inventory transaction history information table T1s, in the storage group number fields of the corresponding records. The control unit 13 also sets unique GPS control numbers in the GPS control number fields of these records. The control unit 13 also sets "0" in the allocation flag fields of the records.

<Normal Inventory Retrieval Process>

Figure 32:
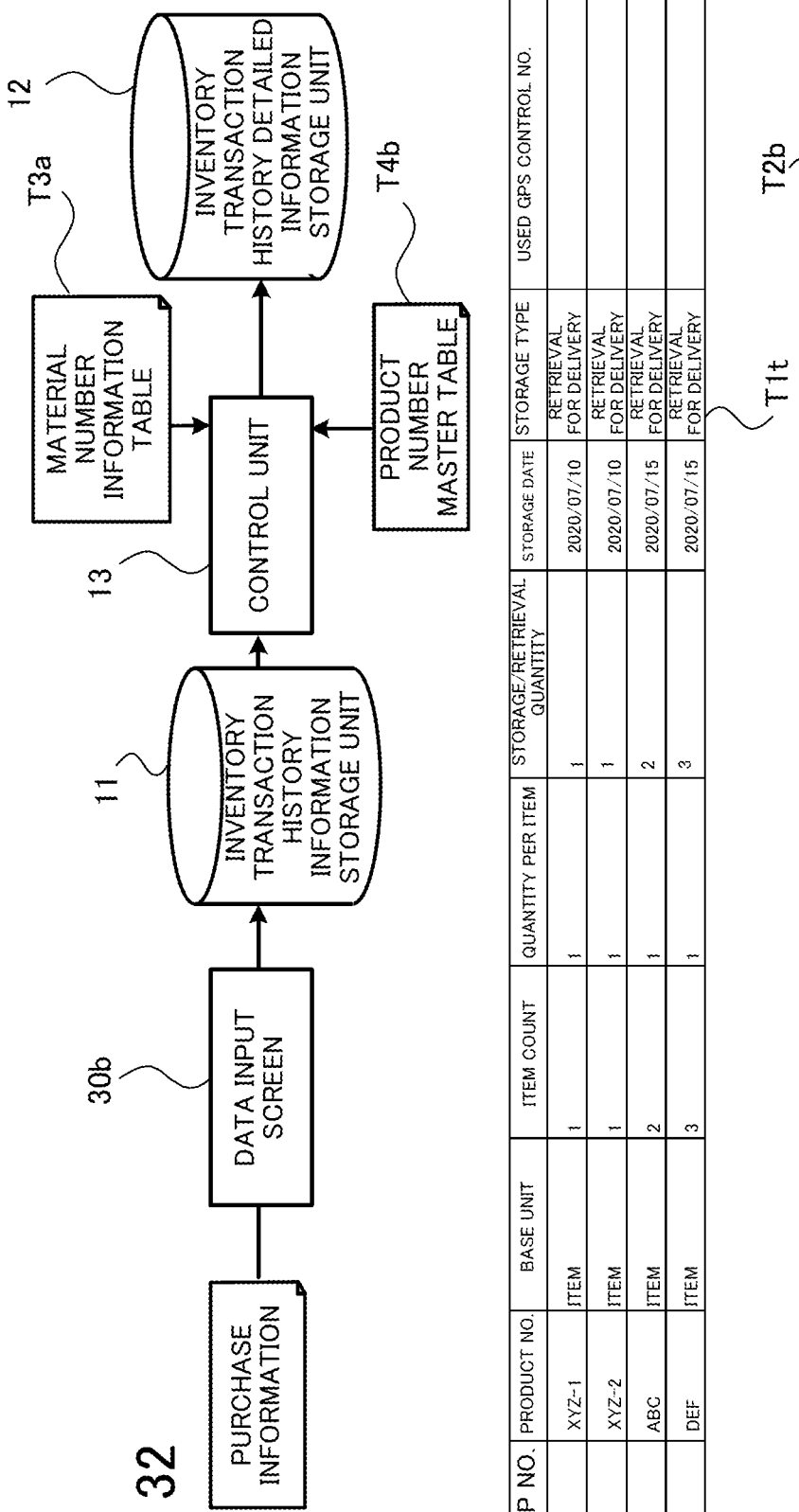
FIG. 32 is a view for explaining a normal inventory retrieval process according to the third embodiment.

FIG. 32 is a view for explaining a normal inventory retrieval process according to the third embodiment.

When receiving a request to retrieve two items XYZ, two items ABC, and three items DEF on Jul. 20, 2020, the user issues a delivery slip for the items XYZ, items ABC, and items DEF, and retrieves two items XYZ, two items ABC, and three items DEF from inventory. The user operates the history management apparatus 1 to display the data input screen 30b on the monitor 104a. Using the data input screen 30b, the user enters, into the history management apparatus 1, the retrieval quantity "2" of the items XYZ, the retrieval quantity "2" of the items ABC, and the retrieval quantity "3" of the items DEF.

When receiving the entry, the control unit 13 creates an inventory transaction history information table T1t for group numbers "15" to "18," as illustrated in FIG. 32. The control unit 13 also refers to the inventory transaction history detailed information table T2b to extract records in ascending order of sequence number from records that have not been assigned retrieval group numbers. Referring to FIG. 32, the records with sequence numbers "17" to "23" are extracted.

The control unit 13 updates the inventory transaction history detailed information in the records with the extracted sequence numbers "17" to "23." More specifically, with respect to each record with the sequence numbers "17" to "23" in the inventory transaction history detailed information table T2*b*, the control unit 13 sets Jul. 20, 2020 in the inventory transaction history retrieval date field and also sets a corresponding one of "15" to "18" that are the group numbers set in the inventory transaction history information table T1*t*, in the retrieval group number field. Then, the control unit 13 sets "2" indicating the completion of retrieval in the allocation flag fields of these records.

<GPS Tracking Process>

Figure 33:
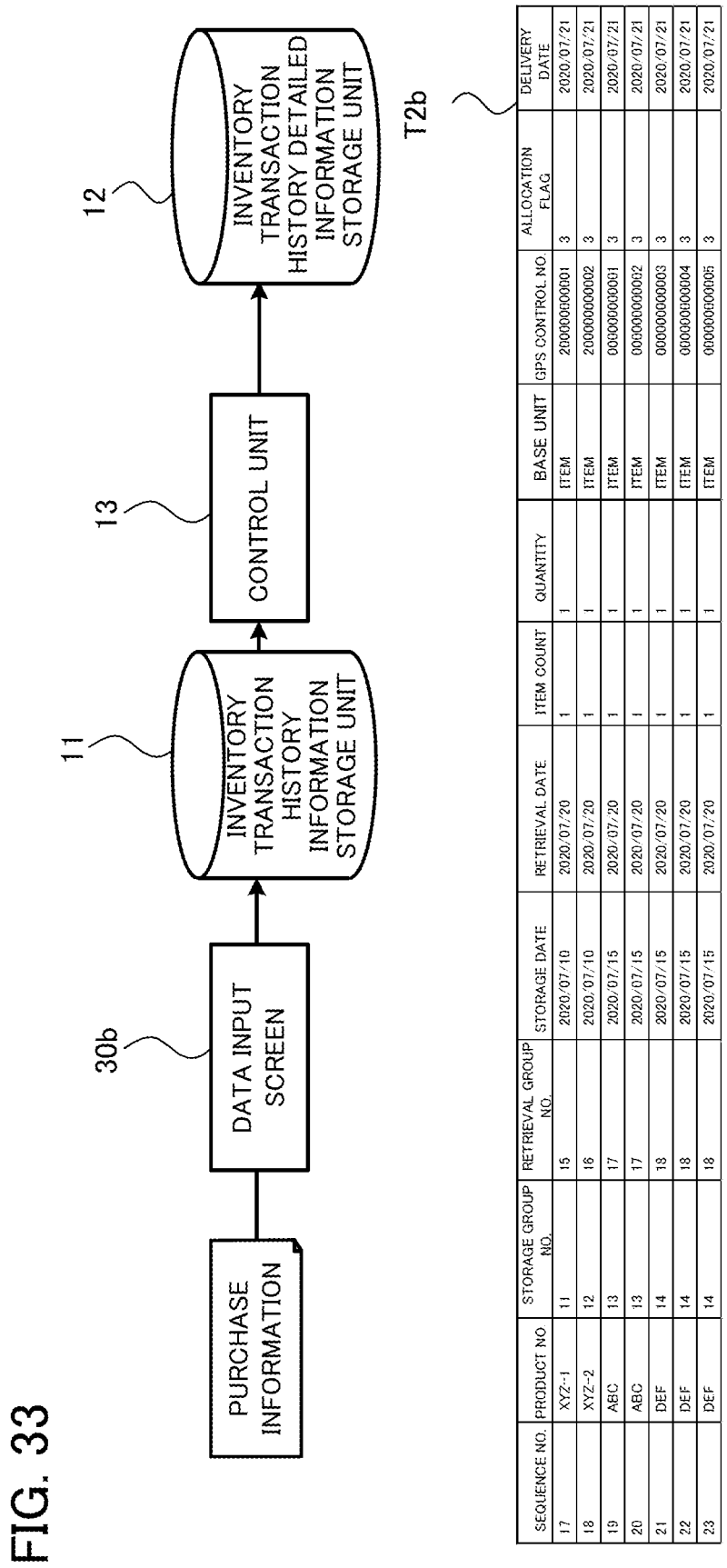
FIG. 33 is a view for explaining a GPS tracking process according to the third embodiment.

FIG. 33 is a view for explaining a GPS tracking process according to the third embodiment.

With respect to the two items XYZ, two items ABC, and three items DEF retrieved in the above-described normal inventory retrieval process, a progress up to the arrival of these items at their delivery destination is tracked using GPS information.

When the user confirms the arrival at the delivery destination, the user operates the history management apparatus 1 to display the data input screen 30*b* on the monitor 104*a*. Using the data input screen 30*b*, the user enters the delivery completion of the two items XYZ, two items ABC, and three items DEF into the history management apparatus 1.

When receiving the entry, the control unit 13 updates the allocation flags to "3" with respect to the sequences given their GPS control numbers. In addition, the control unit 13 sets Jul. 21, 2020 in the delivery date fields.

The history management apparatus of the third embodiment produces the same effects as those of the first and second embodiments.

In addition, the history management apparatus 1 of the third embodiment employs GPS control numbers in the production management and logistics history, so as to manage a flow of entities in the process from production via storage to logistics.

The processes that are performed by the history management apparatus 1 may be performed by a plurality of apparatuses in a distributed manner. For example, one apparatus may be configured to create an inventory transaction history information table, and another apparatus may be configured to use the inventory transaction history information table to create an inventory transaction history detailed information table.

Heretofore, the history management apparatus, history management method, and program have been described with respect to the embodiments illustrated. The embodiments are not limited thereto, and the components of each unit may be replaced with other components having equivalent functions. For example, information stored in advance in each table may be entered directly by a user. By contrast, information that is occasionally entered by a user may be stored in advance in tables. In addition, other desired configurations and steps may be added to the embodiments.

Further, two or more desired configurations (features) in the above-described embodiments may be combined.

The foregoing merely describes the principle of the present invention. A variety of modifications and changes may be made by a person skilled in the art. The present invention is not limited to the exact configurations and application examples described above, and all modifications and equivalents may be regarded as falling within the scope of the invention as claims and equivalents.

<Purposes of why a Program Called Sequence Numbering has been Developed>

The present invention relates to a computer program that has been developed for computing, in real-time, the total value of all assets (movable properties, such as lands, real estates of buildings, forest materials, river sources, cars, and computers, animals and plants and their accompanying things, foods, and properties buried underground) existing in the world (may be considered as "in a specified three-dimensional space"). As a computer that runs this program, what is ideal is that (what is called now) one quantum computer M that is developed for this purpose and has the best performance in the world is used, rather than a plurality of super computers that have a top level of performance in the world, like Fugaku, are used to perform processing in a distributed manner, because the risk of tampering is reduced.

By the way, the status of resources existing in the world is classified into four groups: produced products (hereinafter, referred to as PD) that are in distribution (including ones in inventory); products that are being made (hereinafter, referred to as PU); materials (hereinafter, referred to as PM); and natural resources that are not materials (hereinafter, referred to as PN. *This includes animals and plants).

In principle, although there are different types of assets, it is possible to assign a sequence number (hereinafter, referred to as SN) to every entity. It is also possible for people to give a monetary value to every entity with SN. Therefore, the total amount of all resources existing in the world at the calculation start time (ta) may be calculated by {SN}=sigmaPD+sigmaPU+sigmaPM+sigmaPN=sigmay.

({SN} denotes all entities subjected to sequence numbering, sigmav denotes their total value, and sigmaP* denotes the calculation values of all entities belonging to the four unique resource states.)

By the way, the disclosed program is able to convert a target to be subjected to the sequence numbering, from an entity to currency. If sigmav sigmam is satisfied, where sigmam denotes the total amount (the numerical value of currencies on the market plus currencies on computers) of currency issued in the word, which changes with time, as of a time point (ta), it means that humans are not broke. If sigmav<sigmam is satisfied, this means that currency that is more valued than actual assets are issued and distributed. The amount of currency, computed by sigmav−sigmam<0, is just a scrap of paper. The amount of currency issued in each country of the world at present and in the past is not made public. That is to say, since people have not calculated the amount of currency existing in the world as of the time point (ta), we do not know exactly the total amount of issued currency. The program of the present invention is usable to solve such a problem whose answer is uncertain. This program is able to both calculate the total value of all assets existing in the world and calculate the amount of issued currency as a base for measuring the assets. As a result, the State is able to easily find an illegal movement of assets, such as tax evasion and underground economy.

The above-described processing functions may be implemented by using a computer. In this case, a program is prepared, which describes processes for the functions of the history management apparatus 1, 1*a*. A computer implements the above-described processing functions by executing the program. The program describing the intended processes may be stored on a computer-readable storage medium. Computer-readable storage media include magnetic storage devices, optical discs, magneto-optical storage media, semiconductor memories, and others. The magnetic storage devices include hard disk drives, flexible disks (FDs), magnetic tapes, and others. The optical discs include DVDs, DVD-RAMs, CD-ROMs, CD-RWs, and others. The magneto-optical storage media include magneto-optical disks (MOs) and others.

To distribute the program, portable storage media, such as DVDs and CD-ROMs, on which the program is stored, may be put on sale. Alternatively, the program may be stored in the storage device of a server computer and may be transferred from the server computer to other computers over a network.

A computer which is to execute the above program stores in its local storage device the program recorded on a portable storage medium or transferred from the server computer, for example. Then, the computer reads the program from the local storage device, and runs the program. The computer may run the program directly from the portable storage medium. Also, while receiving the program being transferred from the server computer over a network, the computer may sequentially run this program.

In addition, the above-described processing functions may also be implemented wholly or partly by using a DSP (digital signal processor), an ASIC (application-specific integrated circuit), a PLD (programmable logic device), or other electronic circuits.

According to one aspect, it becomes easy to manage a history of logistics.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

The invention claimed is:

1. A history management apparatus comprising:
a computer processor with associated memory storing instructions configuring the computer processor to,
display information of an inventory on a terminal,
receive, from the terminal, a quantity of a management target of the inventory at a first date,
write a first information record associating the quantity of a management target with a unique group ID and a second information record having a number of entries equal to the quantity of the management target, wherein each entry is assigned a unique sequence ID, the first date, and a first flag that indicates an existence of the management target, all in association with the unique group ID,
receive, from the terminal, a decrease in quantity of the management target of the inventory at a second date,
write, in response to the decrease in quantity of the management target, an additional entry in the first information record associating the decrease in quantity of the management target with a new group ID and the second date,
write, in a number of entries in the second information record equal to the decrease in quantity of the management target, the second date, the second flag, and the new group ID in association with the unique sequence ID of each of the entries, wherein the second flag overwrites the first flag in each of the entries and indicates an absence of the management target, and
display, in a graphical user interface on the terminal, the unique sequence ID, the unique group ID, and the first date in association with each other from all and only entries of the second information record having the first flag on the terminal so that all users of the apparatus are able, in real-time, to determine the inventory does not match the second information record and determine a date when the non-matching occurred.

2. The history management apparatus according to claim 1, wherein the processor is further configured to,
receive, from the terminal, an increased quantity of the management target of the inventory at a third date, and
write, in response to the increased quantity of the management target, a third information record associating the increased quantity of the management target with a unique group ID and a fourth information record having a number of entries equal to the increased quantity of the management target, wherein each entry is assigned a unique sequence ID, the third date, and the first flag indicating the existence of the management target.

3. The history management apparatus according to claim 1, wherein the processor is further configured to,
write a third information record associating quantity information with each type of the management target.

4. The history management apparatus according to claim 3, wherein the processor is further configured to,
receive, from the terminal, an increased quantity of the management target of the inventory at a third date, and
write, in response to the increased quantity of the management target, in the third information record the increased quantity of the management target in association with a unique group ID, and a fourth information record having a number of entries equal to the increased quantity of the management target, wherein each entry is assigned a unique sequence ID, the third date, and the first flag indicating the existence of the management target.

5. The history management apparatus according to claim 1, wherein the processor is further configured to,
associate the second information record with third information for positional identification, and
change, upon receiving an input indicating an arrival of the management target at a destination, the second flag included in the second information record to a third flag indicating the arrival at the destination.

6. A history management method comprising:
displaying, by a computer processor, information of an inventory on a terminal;
receiving, by the computer processor from the terminal, a quantity of a management target of the inventory at a first date;
writing, by the computer processor, a first information record associating the quantity of a management target with a unique group ID and a second information record having a number of entries equal to the quantity of the management target, wherein each entry is assigned a unique sequence ID, the first date, and a first flag that indicates an existence of the management target, all in association with the unique group ID;
receiving, by the computer processor from the terminal, a decrease in quantity of the management target of the inventory at a second date;
writing, by the computer processor, in response to the decrease in quantity of the management target, an additional entry in the first information record associating the decrease in quantity of the management target with a new group ID and the second date;

writing, by the computer processor, in a number of entries in the second information record equal to the decrease in quantity of the management target, the second date, the second flag, and the new group ID in association with the unique sequence ID of each of the entries, wherein the second flag overwrites the first flag in each of the entries and indicates an absence of the management target; and displaying, by the computer processor, in a graphical user interface on the terminal, the unique sequence ID, the unique group ID, and the first date in association with each other from all and only entries of the second information record having the first flag on the terminal so that all users of the apparatus are able, in real-time, to determine the inventory does not match the second information record and determine a date when the non-matching occurred.

7. A non-transitory computer-readable storage medium storing a program that causes a computer processor to:

display information of an inventory on a terminal, receive, from the terminal, a quantity of a management target of the inventory at a first date, write a first information record associating the quantity of a management target with a unique group ID and a second information record having a number of entries equal to the quantity of the management target, wherein each entry is assigned a unique sequence ID, the first date, and a first flag that indicates an existence of the management target, all in association with the unique group ID, receive, from the terminal, a decrease in quantity of the management target of the inventory at a second date, write, in response to the decrease in quantity of the management target, an additional entry in the first information record associating the decrease in quantity of the management target with a new group ID and the second date, write, in a number of entries in the second information record equal to the decrease in quantity of the management target, the second date, the second flag, and the new group ID in association with the unique sequence ID of each of the entries, wherein the second flag overwrites the first flag in each of the entries and indicates an absence of the management target, and display, in a graphical user interface on the terminal, the unique sequence ID, the unique group ID, and the first date in association with each other from all and only entries of the second information record having the first flag on the terminal so that all users of the apparatus are able, in real-time, to determine the inventory does not match the second information record and determine a date when the non-matching occurred.

* * * * *